US011886765B2

(12) United States Patent
Mao

(10) Patent No.: US 11,886,765 B2
(45) Date of Patent: Jan. 30, 2024

(54) HEAD-MOUNTED DISPLAY DEVICE AND DISPLAY METHOD THEREOF TO REDUCE POWER CONSUMPTION OF THE HEAD-MOUNTED DISPLAY DEVICE

(71) Applicant: Huawei Technologies Co., Ltd., Shenzhen (CN)

(72) Inventor: Chunjing Mao, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 46 days.

(21) Appl. No.: 17/614,954

(22) PCT Filed: May 30, 2020

(86) PCT No.: PCT/CN2020/093618
§ 371 (c)(1),
(2) Date: Nov. 29, 2021

(87) PCT Pub. No.: WO2020/244470
PCT Pub. Date: Dec. 10, 2020

(65) Prior Publication Data
US 2022/0222026 A1 Jul. 14, 2022

(30) Foreign Application Priority Data
Jun. 3, 2019 (CN) .......................... 201910478280.X

(51) Int. Cl.
G09G 5/00 (2006.01)
G06F 3/14 (2006.01)
(Continued)

(52) U.S. Cl.
CPC ....... *G06F 3/1431* (2013.01); *G02B 27/0176* (2013.01); *G06F 3/147* (2013.01); *G09G 3/2077* (2013.01); *G09G 2330/021* (2013.01)

(58) Field of Classification Search
CPC ... G06F 3/1431; G06F 3/147; G02B 27/0176; G09G 3/2077
(Continued)

(56) References Cited

U.S. PATENT DOCUMENTS

2011/0234774 A1* 9/2011 Satoh ................... H04N 13/378
348/E13.059
2011/0285832 A1* 11/2011 Yoon ...................... G09G 3/003
348/E13.059
(Continued)

FOREIGN PATENT DOCUMENTS

CN 102200645 A 9/2011
CN 102279468 A 12/2011
(Continued)

Primary Examiner — Jonathan M Blancha
(74) Attorney, Agent, or Firm — Conley Rose, P.C.

(57) ABSTRACT

A head-mounted display device, where when the head-mounted display device enables a low power consumption display mode, a left-eye display system and a right-eye display system alternately display an image. A switching time interval for the left-eye display system and the right-eye display system to alternately display the image is determined based on a current display mode. Different current display modes correspond to different switching time intervals, or correspond to a same switching time interval. Therefore, in the low power consumption display mode of the head-mounted display device, one display system displays the image within a same time period to reduce power consumption of the head-mounted display device.

20 Claims, 16 Drawing Sheets

(51) Int. Cl.
   *G02B 27/01* (2006.01)
   *G06F 3/147* (2006.01)
   *G09G 3/20* (2006.01)

(58) Field of Classification Search
   USPC .......................................................... 345/8
   See application file for complete search history.

(56) References Cited

U.S. PATENT DOCUMENTS

| | | | |
|---|---|---|---|
| 2012/0206443 A1* | 8/2012 | Kimura | G09G 3/3233 345/419 |
| 2016/0109931 A1* | 4/2016 | Kobayashi | G02B 27/017 345/212 |
| 2016/0291666 A1 | 10/2016 | Hosoya et al. | |
| 2019/0068959 A1 | 2/2019 | Ukai et al. | |
| 2020/0286449 A1 | 9/2020 | Yang | |

FOREIGN PATENT DOCUMENTS

| | | |
|---|---|---|
| CN | 107688240 A | 2/2018 |
| CN | 109471603 A | 3/2019 |
| CN | 110426848 A | 11/2019 |
| EP | 2337369 A1 | 6/2011 |
| EP | 3951476 A1 | 2/2022 |
| JP | H08179275 A | 7/1996 |

\* cited by examiner

HEAD-MOUNTED DISPLAY DEVICE AND DISPLAY METHOD THEREOF TO REDUCE POWER CONSUMPTION OF THE HEAD-MOUNTED DISPLAY DEVICE

CROSS-REFERENCE TO RELATED APPLICATIONS

This is a U.S. National Stage of International Patent Application No. PCT/CN2020/093618 filed on May 30, 2020, which claims priority to Chinese Patent Application No. 201910478280.X filed on Jun. 3, 2019, which are hereby incorporated by reference in their entireties.

TECHNICAL FIELD

This application relates to the field of head-mounted display device technologies, and in particular, to a head-mounted display device and a display method thereof.

BACKGROUND

A head-mounted display device (Head Mount Display, HMD for short hereinafter) is also called a head display. The HMD magnifies, by using a group of optical systems (mainly precision optical lenses), an image that is displayed on an ultra-micro display, projects the image on a retina, and then presents a large-screen image to a user's eyes. By sending an optical signal to the user's eyes through various head displays, virtual reality (virtual reality, VR for short hereinafter) and augmented reality (augmented reality, AR for short hereinafter) can be implemented.

Currently, the head-mounted display device is basically a binocular display device. Because display power consumption accounts for more than half of power consumption of the entire device, the power consumption causes the entire device to heat up and working time to decrease, and high power consumption affects a lifespan and safety of a battery. In a case of a given working time requirement, reduction of the power consumption can effectively reduce a battery power requirement, thereby reducing weights and volumes of the battery and the entire device. On the other hand, a lifespan of a display component is limited, and continuous working for a long time accelerates aging of the display component. In addition, compared with a lifespan of another component of the entire device, the lifespan of the display component is shorter and is a short board that determines a lifespan of the entire device.

Power consumption of an entire display system mainly includes power consumption of a display source (that is, a light source) and that of a display driver. Existing methods for reducing display power consumption mainly include: method (1): directly reducing display brightness of the AR or VR; and method (2): indirectly reducing display brightness of the AR through auxiliary shading.

However, the two methods both have drawbacks. The method (1) is not applicable to all scenarios, for example, cases in which the AR is used in an outdoor environment and in a bright environment. In addition, reducing the display brightness may affect user experience of using the AR and VR. Use of the method (2) may affect determining of a real environment, which incurs safety risks. On the other hand, only the power consumption of the display source can be reduced by reducing the display brightness, but the power consumption of the display driver is not reduced. However, the power consumption of the display driver accounts for more than half of the power consumption of the entire display system.

SUMMARY

This application provides a head-mounted display device and a display method thereof, to reduce power consumption of a display system of the head-mounted display device.

According to a first aspect, this application provides a display method of a head-mounted display method that is applied to a display control unit of the head-mounted display device and that includes: determining a current display mode in response to that the head-mounted display device enables a low power consumption display mode; determining a switching time interval based on the current display mode; controlling a left-eye display system to display an image and controlling a right-eye display system to be turned off; in response to that display duration of the left-eye display system reaches first preset duration, turning off the left-eye display system and maintaining an off state of the right-eye display system; and in response to that an off state of the left-eye display system lasts for the switching time interval, controlling the right-eye display system to display the image and maintaining the off state of the left-eye display system.

The display method further includes: in response to that display duration of the right-eye display system reaches second preset duration, turning off the right-eye display system and maintaining the off state of the left-eye display system; and in response to that the off state of the right-eye display system lasts for the switching time interval, controlling the left-eye display system to display the image and maintaining the off state of the right-eye display system.

According to the solution provided in this embodiment, when the head-mounted display device enables the low power consumption display mode, the left-eye display system and the right-eye display system of the head-mounted display device alternately display a image (to be specific, the left-eye display system and the right-eye display system are switched in turn to display the image) instead of displaying the image. The switching time interval for the left-eye display system and the right-eye display system to alternately display the image is determined based on the current display mode. Different current display modes may be corresponding to different switching time intervals, or may be corresponding to a same switching time interval. Therefore, in the low power consumption display mode, only one display system (the left-eye or right-eye display system) displays the image within a same time period, and thus power consumption of the display systems of the head-mounted display device is reduced. Further, both the left-eye display system and the right-eye display system are in the off state within the switching time interval between the two display systems, so that human eyes can adapt to switching between both eyes more comfortably.

If the current display mode is a two-dimensional display mode, the switching time interval is a first switching time interval, or if the current display mode is a three-dimensional display mode, the switching time interval is a second switching time interval, where the second switching time interval is less than the first switching time interval.

According to the solution provided in this embodiment, when being the two-dimensional display mode or the three-dimensional display mode, the current display mode is corresponding to a different switching time interval (the two-dimensional display mode is corresponding to the first switching time interval, and the three-dimensional display mode is corresponding to the second switching time interval). Compared with the two-dimensional display mode, the three-dimensional display mode requires a user to perceive a image of a three-dimensional display effect through both eyes. Therefore, the second switching time interval is less than the first switching time interval.

Optionally, if the current display mode is the two-dimensional display mode, when the left-eye display system displays the image, a brightness grayscale of the image displayed by the left-eye display system is adjusted, or when the right-eye display system displays the image, a brightness grayscale of the image displayed by the right-eye display system is adjusted.

According to the solution provided in this embodiment, in the two-dimensional display mode, only one display system displays a image within a same time period, but the user can still perceive the image through both eyes by adjustment of a position of the image (for example, when the left-eye display system displays the image, the image is positioned more rightward than that simultaneously displayed by the left-eye and right-eye display systems). However, the user may perceive a brightness grayscale difference on the whole (for example, when only the left-eye display system displays the image, the user may perceive, on the whole, that a brightness grayscale of the image is adjusted, and brightness of the image gradually decreases from left to right). In view of that, the brightness grayscale of the image is adjusted by using a software policy in this embodiment. For example, in each image frame, a region perceived to be dark by the brain is brightened in advance, and a region perceived to be bright by the brain is darkened in advance, to ensure consistency in overall imaging perception for an image output for display.

Optionally, the head-mounted display method further includes: determining, based on an environmental parameter or a user-input instruction, that the head-mounted display device enables the low power consumption display mode. The environmental parameter includes a temperature of the head-mounted display device or a battery level of the head-mounted display device.

According to the solution provided in this embodiment, a manner of display switching between each eye is used only when the head-mounted display device enables the low power consumption display mode, to reduce the power consumption of the display systems. Therefore, by adding a function of display switching between each eye on a basis of an existing function of simultaneous display to both eyes, a function of normal display to both eyes is not affected in the head-mounted display device. In addition, when the temperature or power of the head-mounted display device is lower than a critical value (that is, the current environmental parameter is less than the critical value), or an instruction that is sent by the user and that is for switching to the low power consumption display mode is received, the low power consumption display mode is enabled, which can reduce the power consumption of the display systems. In this way, lifespans of a component and a battery that are of the head-mounted display device are prolonged, thereby prolonging a lifespan of the entire device.

According to a second aspect, this application provides a head-mounted display apparatus, including a display control unit, a left-eye display system, and a right-eye display system. The left-eye display system is configured to display an image. The right-eye display system is configured to display an image. The display control unit is configured to: determine a current display mode in response to that the head-mounted display device enables a low power consumption display mode; determine a switching time interval based on the current display mode; control the left-eye display system to display an image and control the right-eye display system to be turned off; in response to that display duration of the left-eye display system reaches first preset duration, turn off the left-eye display system and maintain an off state of the right-eye display system; and in response to that an off state of the left-eye display system lasts for the switching time interval, control the right-eye display system to display the image and maintain the off state of the left-eye display system.

The display control unit is further configured to: in response to that display duration of the right-eye display system reaches second preset duration, turn off the right-eye display system and maintain the off state of the left-eye display system; and in response to that the off state of the right-eye display system lasts for the switching time interval, control the left-eye display system to display the image and maintain the off state of the right-eye display system.

The first preset duration is equal to the second preset duration.

The display control unit is further configured to: if the current display mode is a two-dimensional display mode, determine that the switching time interval is a first switching time interval, or if the current display mode is a three-dimensional display mode, determine that the switching time interval is a second switching time interval, where the second switching time interval is less than the first switching time interval.

The display control unit is further configured to: if the current display mode is the two-dimensional display mode, when the left-eye display system displays the image, adjust a brightness grayscale of the image displayed by the left-eye display system, or when the right-eye display system displays the image, adjust a brightness grayscale of the image displayed by the right-eye display system.

The display control unit is further configured to: determine the first preset duration based on a preset quantity of frames of left-eye display; and determine the second preset duration based on a preset quantity of frames of right-eye display.

The quantity of frames of left-eye display is equal to the quantity of frames of right-eye display.

The display control unit is further configured to: based on an environmental parameter or a user-input instruction, determine that the head-mounted display device enables the low power consumption display mode.

The environmental parameter includes a temperature of the head-mounted display device or a battery level of the head-mounted display device.

According to the solution provided in this embodiment, the head-mounted display device may be a virtual reality head-mounted display device. Because this type of display is configured to display an image, the two-dimensional display mode or the three-dimensional display mode may be used based on an application requirement. The head-mounted display device may alternatively be an augmented reality head-mounted display device. Because in this type of display, a generated image is superimposed on a basis of a real environment, the three-dimensional display mode is mainly used.

It can be learned that, in the foregoing aspects, the low power consumption display mode is set in the head-mounted display device; and when the head-mounted display device enables and enters the low power consumption display mode, the display control unit determines corresponding switching time intervals based on different current display modes, and separately controls the left-eye display system and the right-eye display system to alternately display the image based on the determined switching time intervals. In this way, power consumption of the display systems may be reduced.

BRIEF DESCRIPTION OF DRAWINGS

To describe the technical solutions in the embodiments of this application more clearly, the following briefly describes the accompanying drawings used in the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To better understand the technical solutions of this application, the following describes the embodiments of this application in detail with reference to the accompanying drawings.

It should be clear that the described embodiments are merely a part rather than all of the embodiments of this application. All other embodiments obtained by a person of ordinary skill in the art based on the embodiments of this application without creative efforts shall fall within the protection scope of this application.

A head-mounted display device provided in the embodiments of this application is a display device that magnifies, by using a group of optical systems, an image that is displayed on an ultra-micro display, projects the image (that is, a image) on a retina, and then presents a large-screen image to a user's eyes. The head-mounted display device may be a VR head-mounted display device, an AR head-mounted display device, or a display that may appear in the future and that presents another display effect. However, this does not affect implementation of the technical solutions described in the embodiments of this application.

Figure 1:
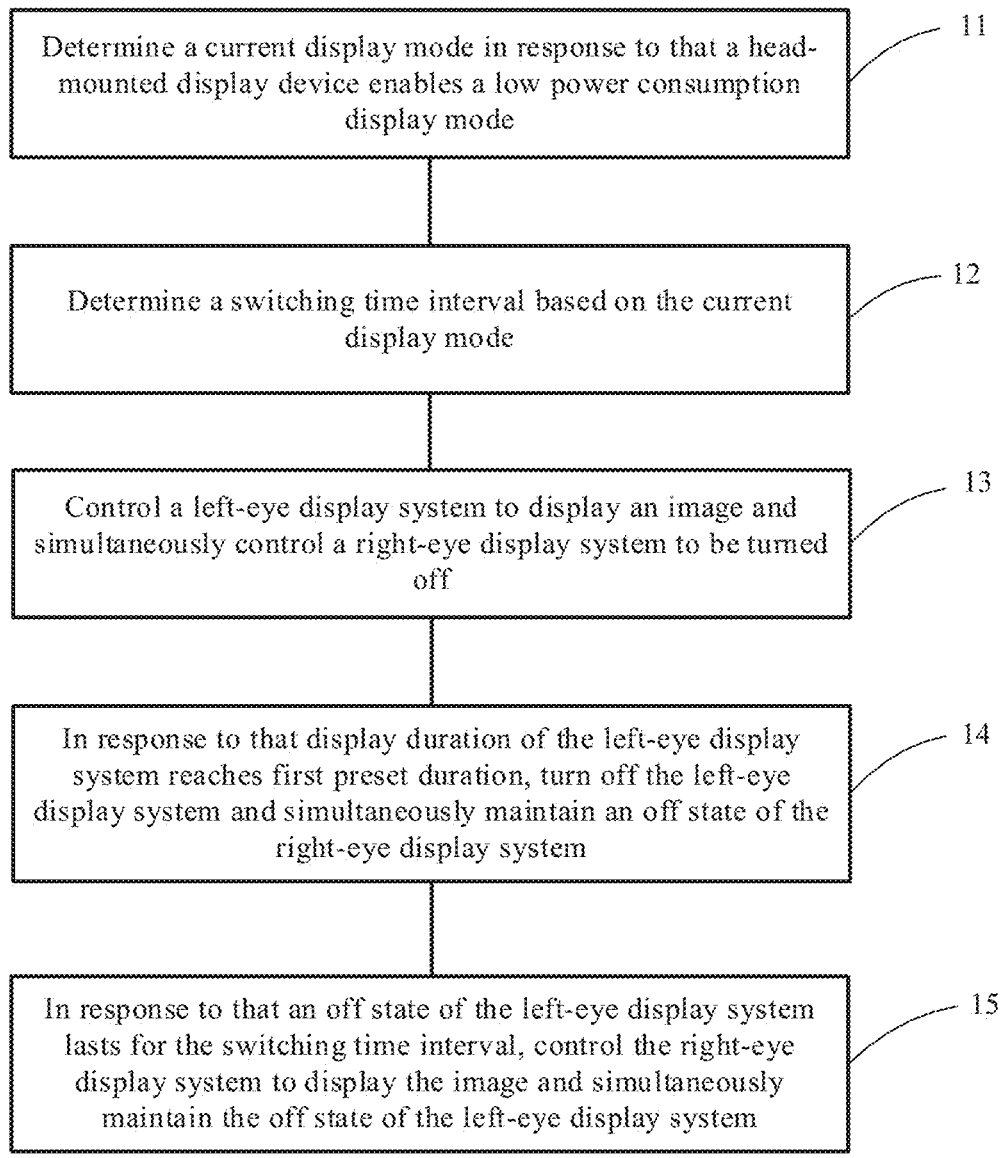
FIG. 1 is a schematic flowchart of a first display method of a head-mounted display device according to an embodiment of this application.

FIG. 1 is a schematic flowchart of a first display method of a head-mounted display device according to an embodiment of this application.

Refer to FIG. 1. The display method includes the following steps.

Step 11: Determine a current display mode in response to that the head-mounted display device enables a low power consumption display mode.

Step 12: Determine a switching time interval based on the current display mode.

Step 13: Control a left-eye display system to display an image and control a right-eye display system to be turned off.

Step 14: In response to that display duration of the left-eye display system reaches first preset duration, turn off the left-eye display system and maintain an off state of the right-eye display system.

Step 15: In response to that an off state of the left-eye display system lasts for the switching time interval, control the right-eye display system to display the image and maintain the off state of the left-eye display system.

Each step in the display method in this embodiment is performed by a display control unit of the head-mounted display device, where the head-mounted display device includes the display control unit, the left-eye display system, and the right-eye display system. It should be noted that, in actual application, the display control unit, the left-eye display system, and the right-eye display system in the head-mounted display device may be named by using other names. The naming in this embodiment is merely intended to reflect a function of each component of the head-mounted display device, but is not a limitation on the technical solutions of this application.

In the technical solutions of this application, the low power consumption display mode is added on a basis of a display mode that is of an existing head-mounted display device and in which a left-eye display system and a right-eye display system display an image (that is, a normal display mode). A method used by the display control unit to control the left-eye display system and the right-eye display system when the head-mounted display device enables the low power consumption display mode is described in this embodiment.

As described in step 11, the current display mode is determined in response to that the head-mounted display device enables the low power consumption display mode.

Specifically, the display control unit of the head-mounted display device may determine the current display mode based on current display content. In actual application, the head-mounted display device stores a plurality of different pieces of display content, and each piece of display content is corresponding to one display mode. For example, different pieces of display content and their corresponding display modes may be distinguished by using different label information, where the label information may be included in a header file of a display source. By using the header file of the display source, whether display content is two-dimensional display content or three-dimensional display content is identified, and then the current display mode is determined. In actual application, the display control unit may alternatively determine the current display content and the current display mode in other manners, which are not listed herein one by one.

In this embodiment, the current display mode includes a two-dimensional display mode and a three-dimensional display mode. In the two-dimensional display mode, the left-eye display, system and the right-eye display system display a same image without parallax, for example, a high-definition image, a piece of text information, or an icon. In the three-dimensional display mode, the left-eye display system and the right-eye display system display two different images with parallax, so that a user can form a three-dimensional image in the brain. For example, a street view or a building is displayed. In another embodiment, the current display mode may alternatively be another display mode, for example, a four-dimensional display mode.

As described in step 12, the switching time interval is determined based on the current display mode.

Specifically, in the low power consumption display mode, the display control unit controls the left-eye display system and the right-eye display system to alternately display the image. In this embodiment, "alternately" indicates that within a same time period, only one display system of the left-eye display system and the right-eye display system is in a working state, the other display system is in the off state, and the states of the two display systems are switched in turn.

In an ideal state, the left-eye display system and the right-eye display system can alternately display the image seamlessly. To be specific, when one display system is turned off, the other display system is turned on, in this case, the switching time interval is zero (that is, no switching time interval). However, in actual application, it is almost difficult to implement seamless alternation of the two display systems. In other words, in a process of switching between the left-eye display system and the right-eye display system to alternately display the image, when one display system is turned off, the other display system cannot be turned on. There is always a switching time interval.

To avoid affecting perception of the user as much as possible when the left-eye display system and the right-eye display system alternately display the image, the display control unit needs to determine corresponding switching time intervals based on different current display modes. Different current display modes are corresponding to different switching time intervals, and certainly may alternatively be corresponding to a same switching time interval.

Figure 2A:
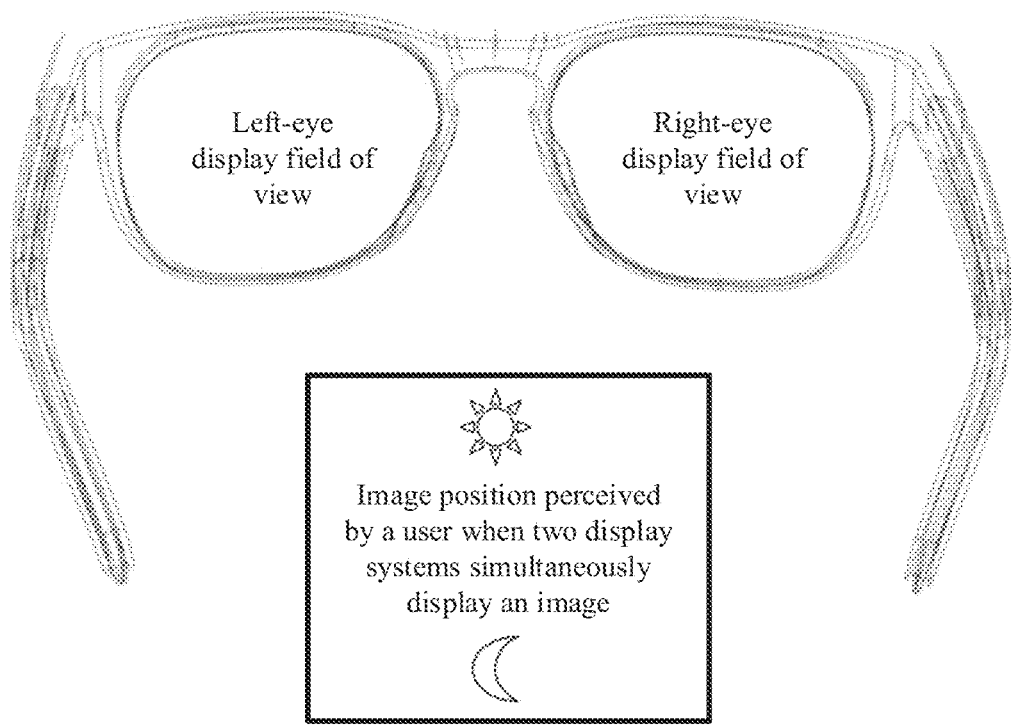
FIG. 2A is a schematic diagram of an image position perceived by a user when a left-eye display system and a right-eye display system display an image in the conventional technology.

In this embodiment, if the current display mode is the two-dimensional display mode, the switching time interval is a first switching time interval, or if the current display mode is the three-dimensional display mode, the switching time interval is a second switching time interval, where the second switching time interval is less than the first switching time interval. In the two-dimensional display mode, although only one display system displays the image within a same time period, the user can still perceive the image through both eyes by adjusting a position of the image. For example, when the left-eye display system and the right-eye display system display an image, that is, when there is the image in both a left-eye display field of view and a right-eye display field of view, an image perceived by the user may be a center position. FIG. 2A shows an image position perceived by a user when a left-eye display system and a right-eye display system display an image in the conventional technology.

Figure 2B:
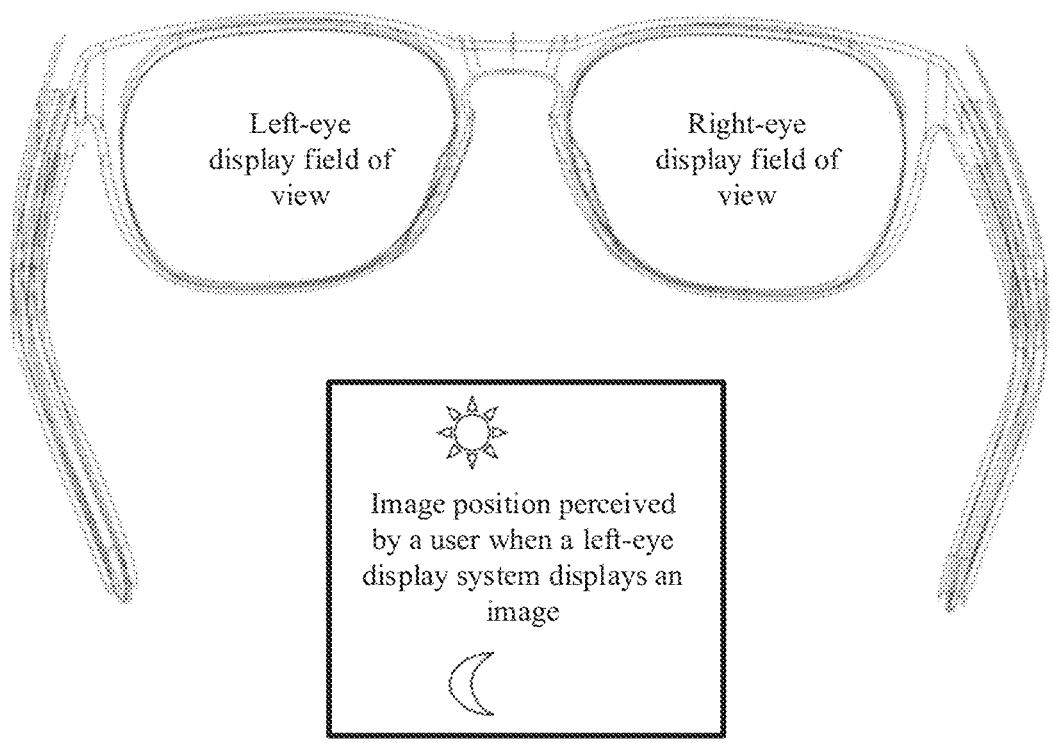
FIG. 2B is a schematic diagram of an image position perceived by a user when only a left-eye display system displays an image (compared with two display systems simultaneously displaying an image), and a position of the displayed image is not adjusted.

However, due to parallax of binocular imaging, when only the left-eye display system displays the image, the user perceives that the displayed image is to the left compared with the image displayed by the two display systems. FIG. 2B shows an image position perceived by a user when only a left-eye display system displays an image.

Figure 3:
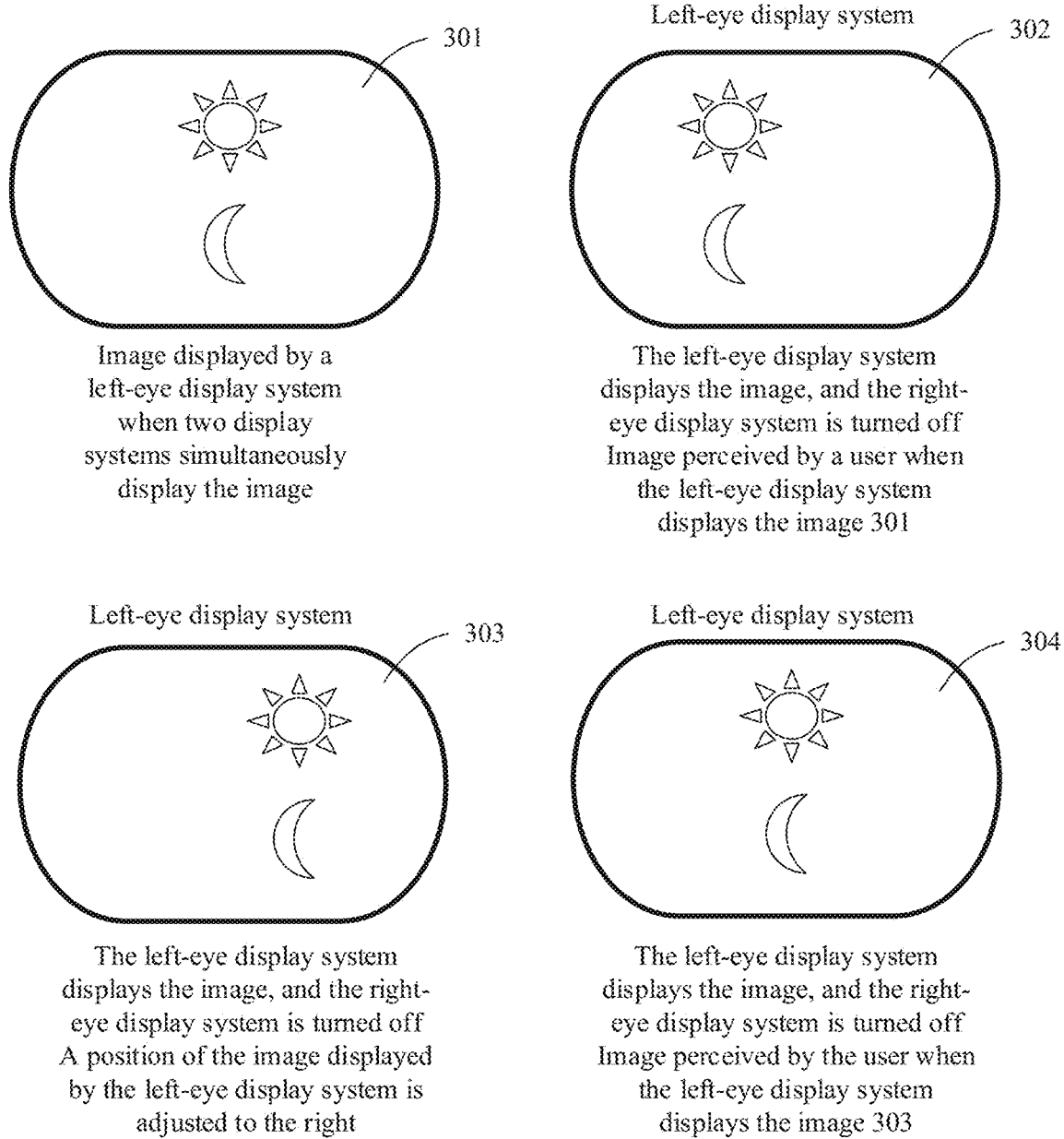
FIG. 3 is a schematic diagram of an image position perceived by a user when only a left-eye display system displays an image, and a position of the displayed image is adjusted.

When only the left-eye display system displays the image, the position of the image displayed by the left-eye display system may be adjusted to the right, to achieve a user perception effect the same as that achieved in binocular display, that is, the displayed image is in the center position. As shown in FIG. 3, an image 301 is an image output by the left-eye display system when both the left-eye display system and the right-eye display system display the image. When the left-eye display system displays the image, and the right-eye display system is turned off, if the left-eye display system still outputs the image 301, an effect of the image perceived by the user is an image 302 due to the parallax of binocular imaging. That is, the user perceives that the displayed image is to the left compared with the image displayed by the left-eye display system and the right-eye display system. When the left-eye display system displays the image, and the right-eye display system is turned off, a position of the image displayed by the left-eye display system is adjusted to the right, for example, an image 303 output by the left-eye display system, to achieve a user perception effect the same as that achieved in binocular display, that is, the displayed image is in the center position. In this way, the position of the image perceived by the user is the center position, as shown by an image 304.

Likewise, due to the parallax of binocular imaging, when only the right-eye display system displays the image, the user perceives that the displayed image is to the right compared with the image displayed by the left-eye display system and the right-eye display system. When the right-eye display system displays the image, and the left-eye display system is turned off, a position of the image displayed by the right-eye display system is adjusted to the left, to achieve a user perception effect the same as that achieved in binocular display, that is, the displayed image is in the center position.

However, in the three-dimensional display mode, human eyes need to perceive, through both eyes, two images with parallax to form a three-dimensional image. Therefore, the second switching time interval is less than the switching time interval in the two-dimensional display mode (that is, the first switching time interval); and a display effect in the three-dimensional display mode is not affected due to persistence of vision of the human eyes.

As described in step 13, the left-eye display system is controlled to display the image, and the right-eye display system is controlled to be turned off. To be specific, when the left-eye display system displays the image, the right-eye display system does not display the image.

As described in step 14, in response to that the display duration of the left-eye display system reaches the first preset duration, the left-eye display system is turned off, and the off state of the right-eye display system is maintained.

As described in step 15, in response to that the off state of the left-eye display system lasts for the switching time interval, the right-eye display system is controlled to display the image, and the off state of the left-eye display system is maintained. To be specific, when the right-eye display system displays the image, the left-eye display system does not display the image.

In the descriptions of step 13 to step 15, the display control unit first controls the left-eye display system to display the image (and controls the right-eye display system to be turned off), and turns off the left-eye display system after the left-eye display system displays the image for the first preset duration. Then, after the switching time interval, the display control unit controls the right-eye display system to display the image (and maintains turnoff of the left-eye display system). In this way, only one display system is in the working state within a same time period.

According to the solution provided in this embodiment, when the head-mounted display device enables the low power consumption display mode, the left-eye display system and the right-eye display system of the head-mounted display device alternately display a image (to be specific, the left-eye display system and the right-eye display system are switched in turn to display the image) instead of displaying the image. The switching time interval for the left-eye display system and the right-eye display system to alternately display the image is determined based on the current display mode. Different current display modes may be corresponding to different switching time intervals, or may be corresponding to a same switching time interval. Therefore, in the low power consumption display mode, only one display system (the left-eye display system or right-eye display system) displays the image within a same time period, and thus power consumption of the display systems of the head-mounted display device is reduced.

Figure 4:
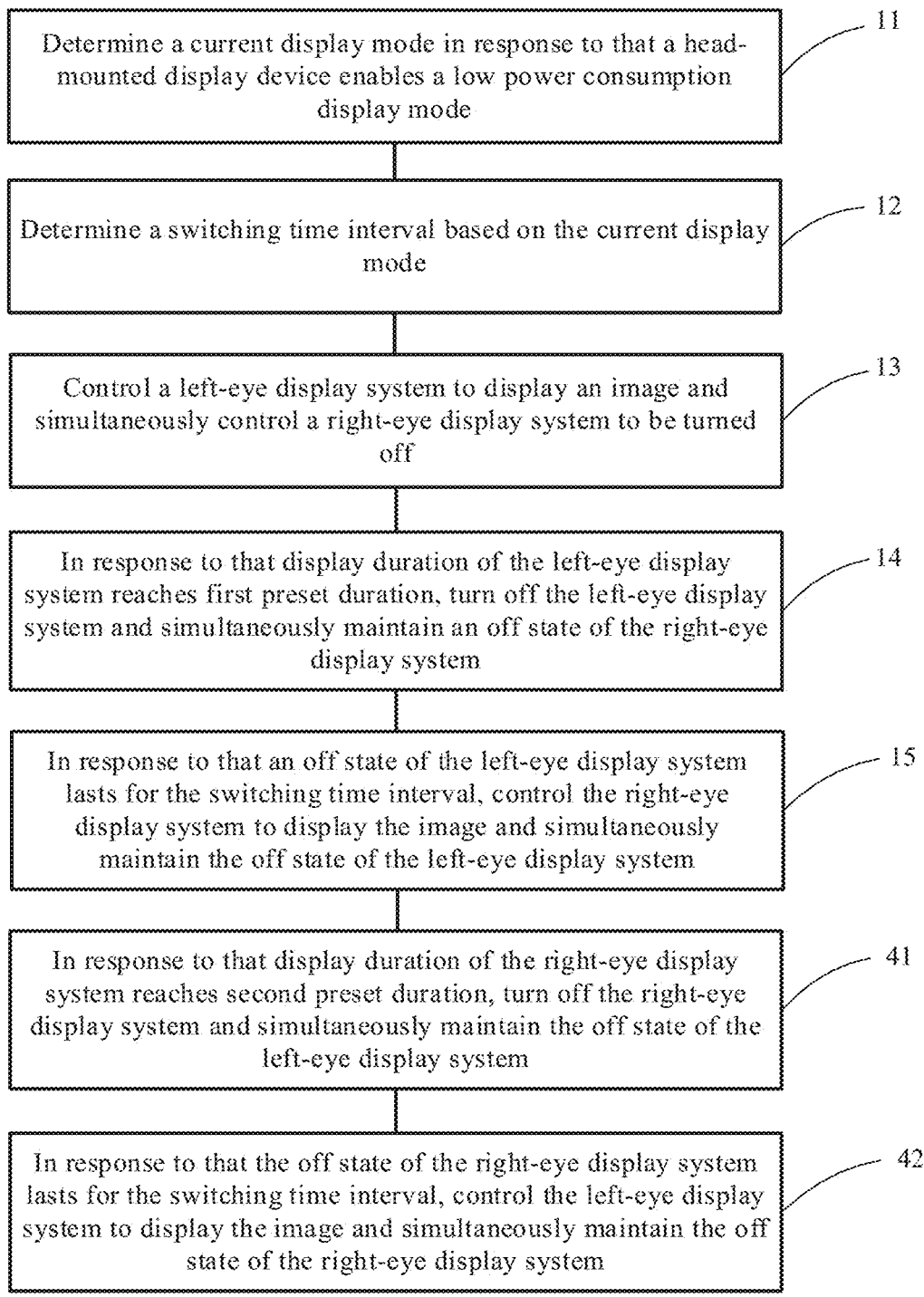
FIG. 4 is a schematic flowchart of a second display method of a head-mounted display device according to an embodiment of this application.

FIG. 4 is a schematic flowchart of a second display method of a head-mounted display device according to an embodiment of this application. On a basis of the embodiment shown in FIG. 1, this embodiment further includes the following steps.

Step 41: In response to that display duration of the right-eye display system reaches second preset duration, turn off the right-eye display system and maintain the off state of the left-eye display system.

Step 42: In response to that the off state of the right-eye display system lasts for the switching time interval, control the left-eye display system to display the image and maintain the off state of the right-eye display system.

A process in which the display control unit alternately controls the left-eye display system and the right-eye display system is described with reference to step 13 to step 15, and step 41 and step 42. The following describes the process in detail with reference to specific embodiments.

Figure 5A:
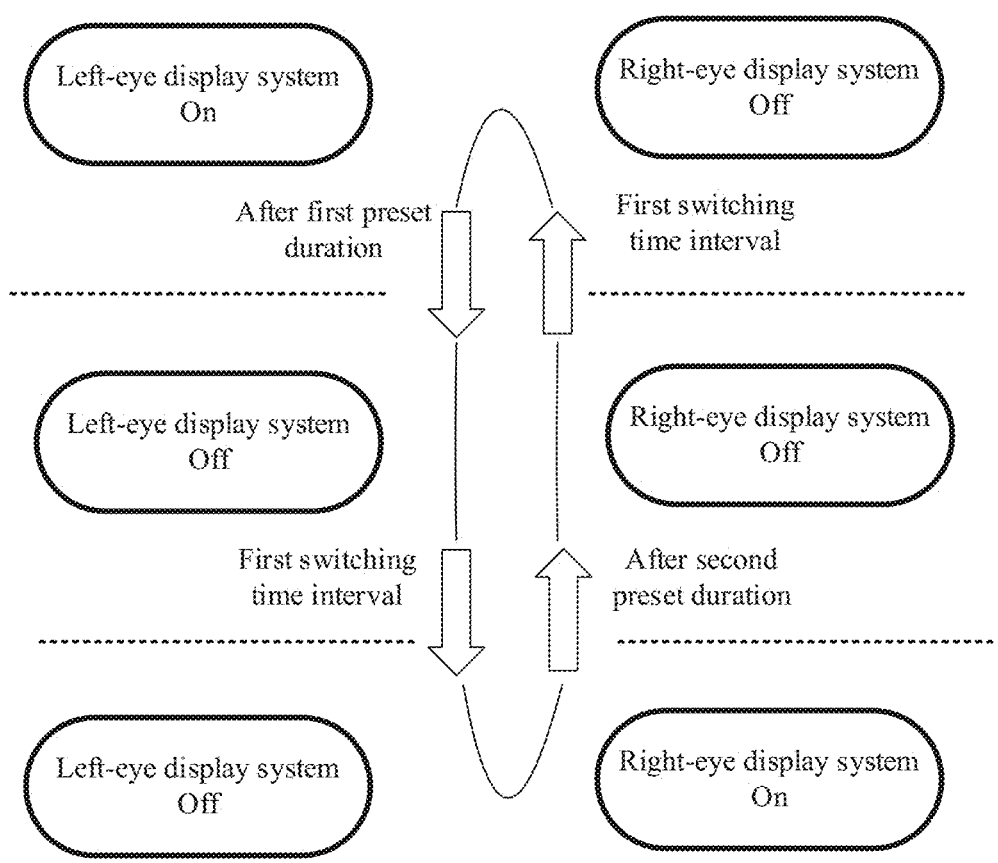
FIG. 5A is a schematic diagram of controlling a left-eye display system and a right-eye display system to alternately display an image in a two-dimensional display mode according to the embodiment shown in FIG. 4.

The following describes the steps in detail with reference to a schematic diagram, shown in FIG. 5A, of controlling a left-eye display system and a right-eye display system to alternately display an image in a two-dimensional display mode.

Refer to FIG. 5A. First, the display control unit controls the left-eye display system to be turned on, and at this point, the right-eye display system is in the off state. Then, the display control unit turns off the left-eye display system when the left-eye display system displays the image for the first preset duration. After the first switching time interval, the display control unit controls the right-eye display system to be turned on, and at this point, the left-eye display system is in the off state. In other words, within the first switching time interval (that is, a time period between turning off of the left-eye display system and turning on of the right-eye display system), both the left-eye display system and the right-eye display system are in the off state. Then, the display control unit turns off the right-eye display system when the right-eye display system displays the image for the second preset duration. After the first switching time interval, the display control unit further controls the left-eye display system to be turned on, and at this point, the right-eye display system is in the off state. In other words, within the first switching time interval (that is, a time period between turning off of the right-eye display system and turning on of the left-eye display system), both the left-eye display system and the right-eye display system are in the off state.

The display control unit controls the left-eye display system and the right-eye display system to alternately display the image according to the control method shown in FIG. 5A, where the first preset duration and the second preset duration may be set in advance, for example, 30 seconds or one minute. In actual application, the first preset duration and the second preset duration that are set in advance may be the same or different. The first preset duration is set in advance to be equal to the second preset duration to make human eyes more adaptable to alternate switching between the left-eye display system and the right-eye display system for displaying a image.

It should be noted that, as shown in FIG. 5A, the display control unit first controls the left-eye display system to be turned on and the right-eye display system to be in the off state, and then alternately switches between the left-eye display system and the right-eye display system based on the first switching time interval. In actual application, the display control unit may alternatively first control the right-eye display system to be turned on and the left-eye display system to be in the off state, and then perform cyclic and alternate switching between the left-eye display system and the right-eye display system based on the first switching time interval.

Figure 5B:
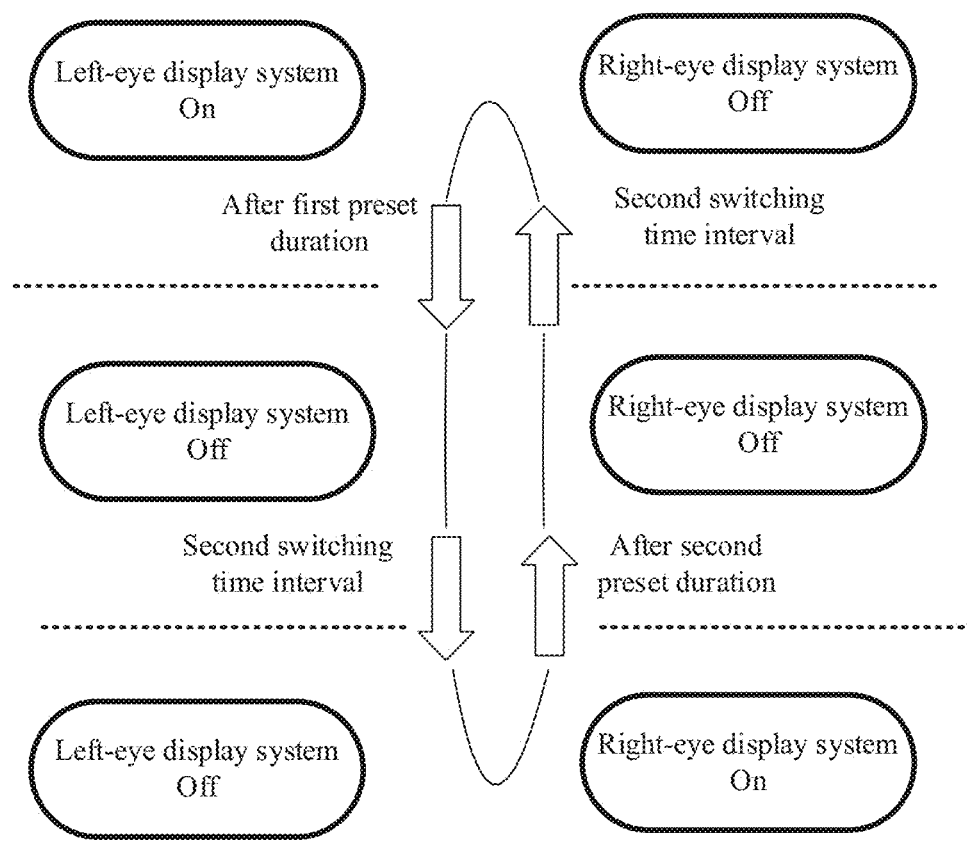
FIG. 5B is a schematic diagram of controlling a left-eye display system and a right-eye display system to alternately display an image in a three-dimensional display mode according to the embodiment shown in FIG. 4.

The following describes the steps in detail with reference to a schematic diagram, shown in FIG. 5B, of controlling a left-eye display system and a right-eye display system to alternately display an image in a three-dimensional display mode.

Refer to FIG. 5B. First, the display control unit controls the left-eye display system to be turned on, and at this point, the right-eye display system is in the off state. Then, the display control unit turns off the left-eye display system when the left-eye display system displays the image for the second preset duration. After the second switching time interval, the display control unit controls the right-eye display system to be turned on, and at this point, the left-eye display system is in the off state. In other words, within the second switching time interval (that is, a time period between turning off of the left-eye display system and turning on of the right-eye display system), both the left-eye display system and the right-eye display system are in the off state. Then, the display control unit turns off the right-eye display system when the right-eye display system displays a image for the second preset duration. After the second switching time interval, the display control unit further controls the left-eye display system to be turned on, and at this point, the right-eye display system is in the off state. In other words, within the second switching time interval (that is, a time period between turning off of the right-eye display system and turning on of the left-eye display system), both the left-eye display system and the right-eye display system are in the off state.

The display control unit controls the left-eye display system and the right-eye display system to alternately display the image according to the control method shown in FIG. 5B.

In the three-dimensional display mode, on the one hand, human eyes need to perceive, through both eyes, two images with parallax to form a three-dimensional image. Therefore, the second switching time interval is less than the switching time interval in the two-dimensional display mode (that is, the first switching time interval); and a display effect in the three-dimensional display mode is not affected due to persistence of vision of the human eyes. On the other hand, the two images with parallax are two images with parallax based on a same piece of display content, and therefore display duration of a monocular display system (the left-eye display system or right-eye display system) is also less than display duration of a monocular display system (the left-eye display system or right-eye display system) in the two-dimensional display mode (that is, the second preset duration is less than the first preset duration).

In this embodiment, the first preset duration of the left-eye display system and the second preset duration of the right-eye display system are determined based on a preset quantity of frames of left-eye display and a preset quantity of frames of right-eye display respectively. Specifically, the quantity of frames of left-eye display and the quantity of frames of right-eye display may be set in advance, for example, one frame or two frames; and frame rates (that is, a quantity of frames displayed per second) at which the left-eye display system and the right-eye display system display an image may be set in advance. In this case, the first preset duration may be determined based on the quantity of flumes of left-eye display and the frame rate that are of the left-eye display system, and the second preset duration may be determined based on the quantity of frames of right-eye display and the frame rate that are of the right-eye display system. In actual application, the quantity of frames of left-eye display and the quantity of frames of right-eye display that are set in advance may be the same or different, and the frame rate at which the left-eye display system displays an image and the frame rate at which the right-eye display system displays an image may be the same or different. To enable the human eyes to perceive the image displayed by the left-eye display system and the image displayed by the right-eye display system, where the two images are displayed with parallax, so that a three-dimensional image is better formed in the brain, the quantity of frames of left-eye display is set in advance to be equal to the quantity of frames of right-eye display, and the frame rate at which the left-eye display system displays an image is the same as the frame rate at which the right-eye display system displays an image. In other words, the first preset duration is equal to the second preset duration.

It should be noted that, as shown in FIG. 5B, the display control unit first controls the left-eye display system to be turned on and the right-eye display system to be in the off state, and then alternately switches between the left-eye display system and the right-eye display system based on the second switching time interval. In actual application, the display control unit may alternatively first control the right-eye display system to be turned on and the left-eye display system to be in the off state, and then alternately switch between the left-eye display system and the right-eye display system based on the second switching time interval.

Figure 6:
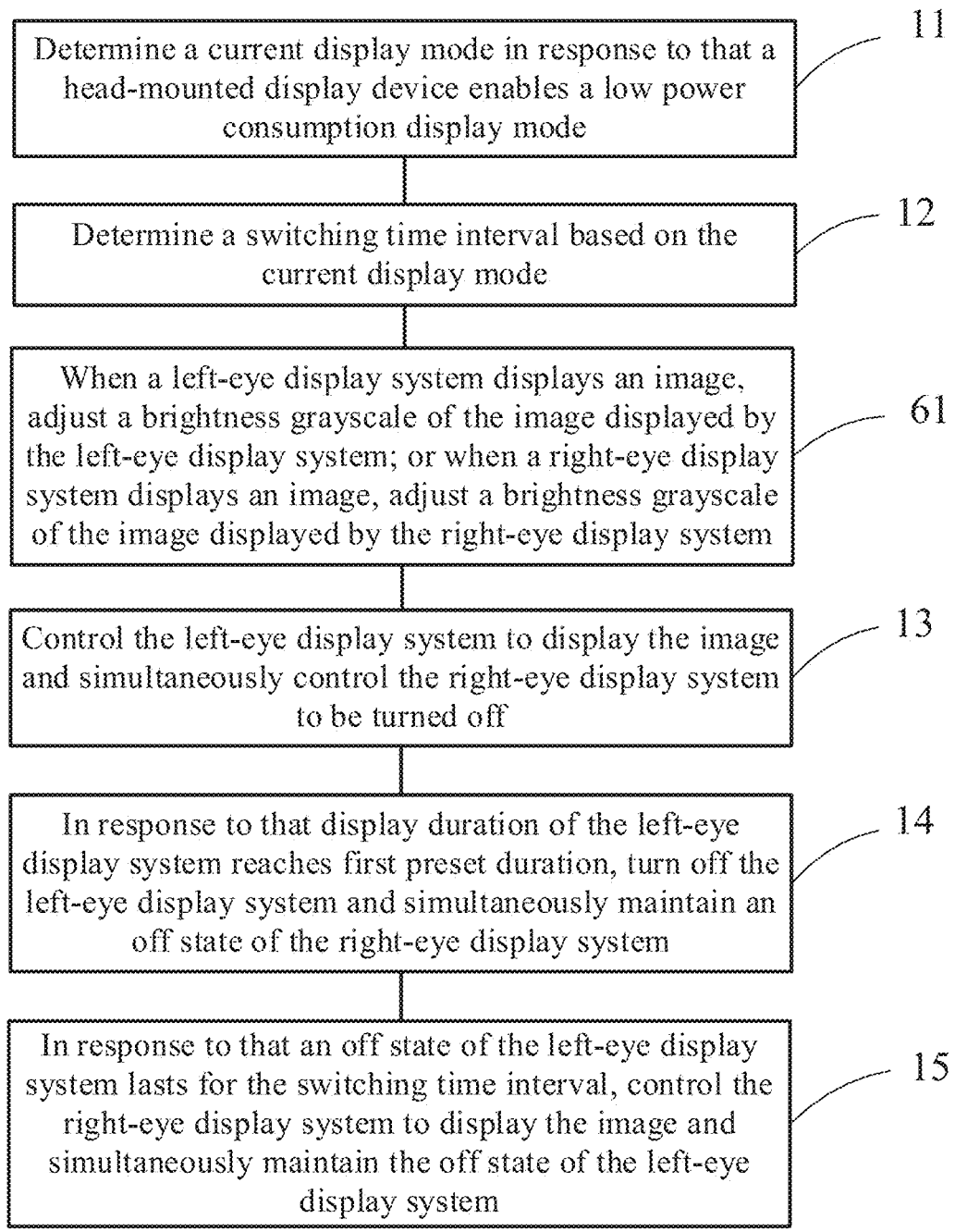
FIG. 6 is a schematic flowchart of a third display method of a head-mounted display device according to an embodiment of this application.

FIG. 6 is a schematic flowchart of a third display method of a head-mounted display device according to an embodiment of this application. Refer to FIG. 6. On a basis of the embodiment shown in FIG. 1, this embodiment further includes the following step.

Step 61: If the current display mode is the two-dimensional display mode, when the left-eye display system displays the image, adjust a brightness grayscale of the image displayed by the left-eye display system, or when the right-eye display system displays the image, adjust a brightness grayscale of the image displayed by the right-eye display system.

This embodiment is based on the embodiment shown in FIG. 1. Although only one display system displays the image within a same time period, by adjusting a position of the image (for example, when the left-eye display system displays the image, compared with the position of the image simultaneously displayed by the left-eye and right-eye display systems, the position of the image may be adjusted to the right), the user can still perceive the image through both eyes, and the image is centered. This is close to an effect of simultaneously displaying the image by the left-eye and right-eye display systems. When only one display system displays the image, in addition to the foregoing problem that the image perceived by the user is not in the center position, there is also a problem of uneven brightness. When only the left-eye display system displays the image, the user perceives that, compared with brightness of the image simultaneously displayed by the left-eye and right-eye display systems, brightness of a left side of the image is higher than brightness of a right side of the image, and the brightness of the right side of the image is comparatively low. To enable the user to perceive an image with uniform brightness, in this embodiment of this application, a brightness grayscale of the image displayed by a monocular display system is adjusted. For example, when a display system renders an image, a preset brightness grayscale compensation value is added to a brightness grayscale of a pixel in the original image, or a preset brightness grayscale compensation value is added to a brightness grayscale of a column pixel in the original image, so that the user perceives the image with uniform brightness.

Figure 7:
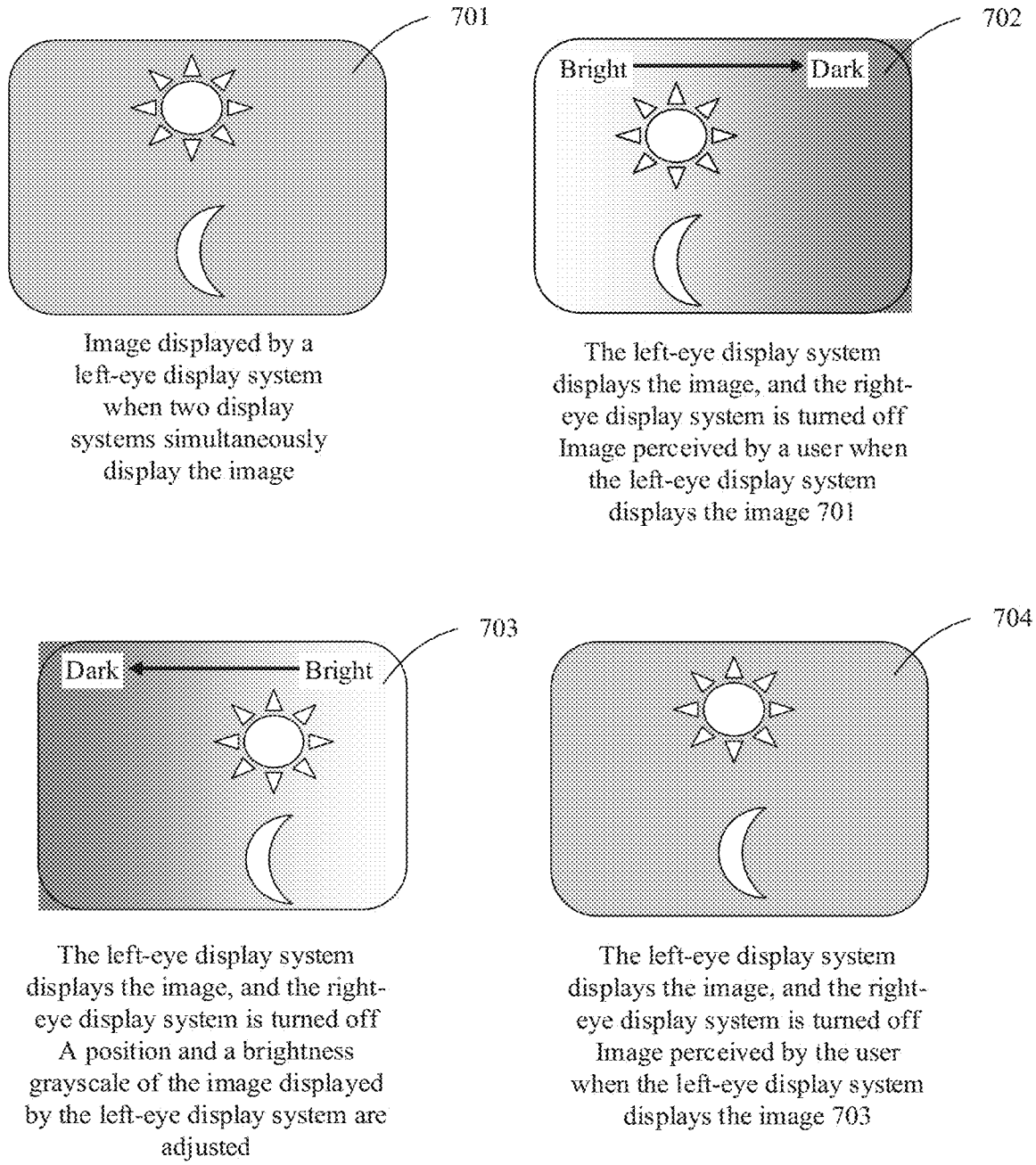
FIG. 7 is a schematic diagram of performing brightness grayscale adjustment on an image displayed by a left-eye display system in the embodiment shown in FIG. 6.

As shown in FIG. 7, an image 701 is an image output by the left-eye display system when both the left-eye display system and the right-eye display system display the image. When the left-eye display system displays the image, and the right-eye display system is turned off, if the left-eye display system still outputs the image 701, the user perceives that the displayed image is to the left compared with the image simultaneously displayed by the left-eye display system and the right-eye display system in addition, image brightness perceived by the user is uneven. As shown by an image 702, the user perceives that brightness of a left side of the image is higher than brightness of a right side of the image. When the left-eye display system displays the image, and the right-eye display system is turned off, to achieve a user perception effect the same as that achieved in binocular display, a position of the image displayed by the left-eye display system is adjusted to the right, to enable the user to perceive that the image is in a center position; and in addition, a preset brightness grayscale compensation value is added to a brightness grayscale of a pixel in the original image, so that the user perceives the image with uniform brightness. An image 703 is an image obtained after the position of the image displayed by the left-eye display system is adjusted to the right, and brightness grayscale compensation is performed on the brightness grayscale of the pixel in the image. When the left-eye display system displays the image, and the right-eye display system is turned off, the left-eye display system outputs the image 703, so that an image perceived by the user is an image 704. To be specific, the image is in the center position, and image brightness is uniform.

Different from the embodiment shown in FIG. 1, in this embodiment, when it is determined that the current display mode is the two-dimensional display mode, before step 13 is performed (that is, control a left-eye display system to display an image and control a right-eye display system to be turned off), step 61 is performed: When the left-eye display system displays the image, adjust a brightness grayscale of the image displayed by the left-eye display system, or when the right-eye display system displays the image, adjust a brightness grayscale of the image displayed by the right-eye display system.

As described above, when only one display system displays an image, the user may perceive, through both eyes, a brightness grayscale difference in the displayed image on the whole, and different users have different perception of the brightness grayscale difference in the image. The brightness grayscale indicates a brightness level. For each image frame, a display source (that is, a light source) behind the image frame may present different brightness levels. Grayscales represent different brightness levels from a darkest level to a brightest level. More levels indicate that a more detailed image can be presented. According to a common user's perception of image brightness, when only the left-eye display system displays an image, the user's both eyes perceive that brightness of the image gradually decreases from left to right on the whole; or when only the right-eye display system displays an image, the user's both eyes perceive that brightness of the image gradually decreases from right to left on the whole.

In this embodiment, for each image frame displayed by the left-eye display system, the adjusting a brightness grayscale of the image displayed by the left-eye display system includes: adding a preset brightness grayscale compensation value to a brightness grayscale of a pixel in each image frame displayed by the left-eye display system, or adding a preset brightness grayscale compensation value to a brightness grayscale of a column pixel in the original image, so that the user perceives the image with uniform brightness. In other words, a region perceived to be comparatively bright by the user is darkened in advance, and a region perceived to be comparatively dark by the user is brightened in advance. The user perceives, through both eyes, that brightness of each image frame displayed by the left-eye display system gradually decreases from left to right on the whole. Therefore, a trend of adjusting the brightness grayscale is a gradual change from darkening to brightening from left to right.

For each image frame displayed by the right-eye display system, the adjusting a brightness grayscale of the image displayed by the right-eye display system includes: adding a preset brightness grayscale compensation value to a brightness grayscale of a pixel in each image frame displayed by the right-eye display system, or adding a preset brightness grayscale compensation value to a brightness grayscale of a column pixel in the original image, so that the user perceives the image with uniform brightness. In other words, a region perceived to be comparatively bright by the user is darkened in advance, and a region perceived to be comparatively dark by the user is brightened in advance. The user perceives, through both eyes, that brightness of each image frame displayed by the right-eye display system gradually increases from left to right on the whole. Therefore, a trend of adjusting the brightness grayscale is a gradual change from brightening to darkening from left to right.

In actual application, brightness grayscale compensation is separately performed on a display source of the left-eye display system and a display source of the right-eye display system by using a software policy, to adjust the brightness grayscale of the image displayed by the left-eye display system or the right-eye display system.

Figure 8:
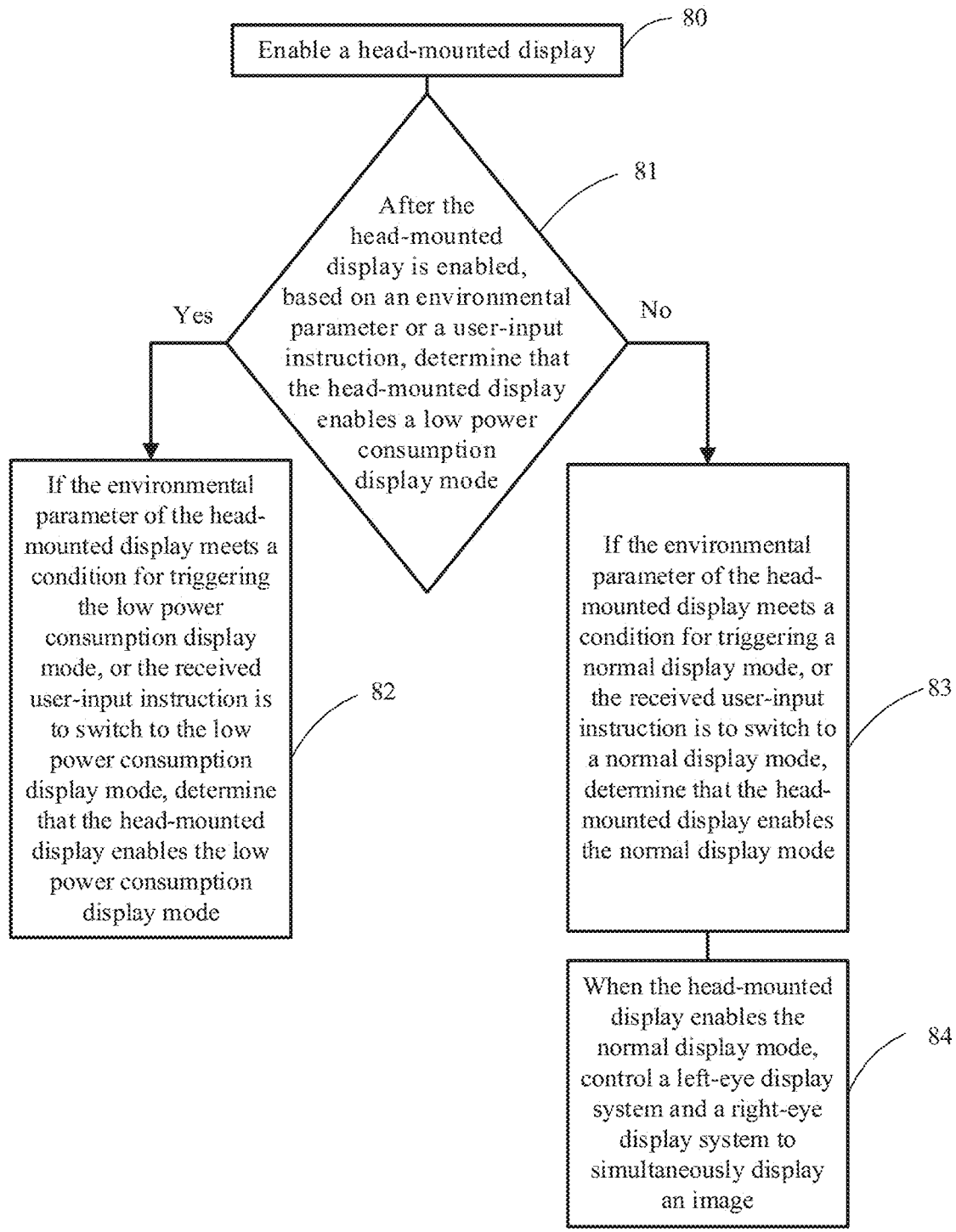
FIG. 8 is a schematic flowchart of a fourth display method of a head-mounted display device according to an embodiment of this application.

FIG. 8 is a schematic flowchart of a fourth display method of a head-mounted display device according to an embodiment of this application.

Refer to FIG. 8. The display method includes the following steps.

Step 80: Enable the head-mounted display device.

Step 81: After the head-mounted display device is enabled, based on an environmental parameter or a user-input instruction, determine that the head-mounted display device enables a low power consumption display mode.

Step 82: If the environmental parameter of the head-mounted display device meets a condition for triggering the low power consumption mode, or the received user-input instruction is to switch to the low power consumption display mode, determine that the head-mounted display device enables the low power consumption display mode.

Step 83: If the environmental parameter of the head-mounted display device meets a condition for triggering a normal display mode, or the received user-input instruction is to switch to a normal display mode, determine that the head-mounted display device enables the normal display mode.

Step 84: When the head-mounted display device enables the normal display mode, control a left-eye display system and a right-eye display system to simultaneously display an image.

As described above, in the technical solutions of this application, the low power consumption display mode is added on a basis of a display mode that is of an existing head-mounted display device and in which a image is simultaneously displayed to both eyes (that is, the normal display mode). Therefore, after the head-mounted display device is enabled, whether to enter the normal display mode or the low power consumption display mode needs to be determined. The solution provided in this embodiment is a specific implementation in which a display control unit determines a display mode that is used for entering.

In this embodiment, after the head-mounted display device is enabled, based on the environmental parameter or the user-input instruction, it is determined that the head-mounted display device enables the low power consumption display mode (that is, step 81).

As described in step 82, if a current environmental parameter of the head-mounted display device meets the condition for triggering the low power consumption display mode, or the received user-input instruction is to switch to the low power consumption display mode, it is determined that the head-mounted display device enables the low power consumption display, mode.

Specifically, in this embodiment, the head-mounted display device may automatically determine to enter the normal display mode or the low power consumption display mode based on a result of comparing the environmental parameter with a critical value. The environmental parameter may be a temperature (to be specific, a current temperature of the head-mounted display device) or a battery level (to be specific, current remaining power of the head-mounted display device). If the current temperature of the head-mounted display device is higher than a critical temperature, or the current remaining power of the head-mounted display device is lower than critical power, the low power consumption display mode is automatically enabled, where the critical temperature and the critical power (that is, the critical value) may be set in advance.

The head-mounted display device may alternatively determine, based on the user-input instruction, a display mode that is used for entering. When the user-input instruction for switching to the low power consumption display mode is received, it is determined that the head-mounted display device enables the low power consumption display mode.

When the head-mounted display device enables the low power consumption mode, the display control unit controls the left-eye display system and the right-eye display system to alternately display the image according to the specific embodiments shown in FIG. 1 to FIG. 7.

As shown in step 83, if the environmental parameter of the head-mounted display device meets the condition for triggering the normal display mode, or the received user-input instruction is to switch to the normal display mode, it is determined that the head-mounted display device enables the normal display mode. Specifically, if the current temperature of the head-mounted display device is higher than the critical temperature or the current remaining power of the head-mounted display device is higher than the critical power, the normal display mode is automatically enabled.

As described in step 84, when the head-mounted display device enables the normal display mode, the left-eye display system and the right-eye display system are controlled to simultaneously display the image.

Based on the foregoing method embodiments, an embodiment of the embodiment of the invention further provides a head-mounted display device, including a display control unit, a left-eye display system, and a right-eye display system. The display control unit is configured to: determine a current display mode in response to that the head-mounted display device enables a low power consumption display mode; determine a switching time interval based on the current display mode; control the left-eye display system to display an image and control the right-eye display system to be turned off; in response to that display duration of the left-eye display system reaches first preset duration, turn off the left-eye display system and maintain an off state of the right-eye display system; and in response to that an off state of the left-eye display system lasts for the switching time interval, control the right-eye display system to display the image and maintain the off state of the left-eye display system.

The display control unit is further configured to: in response to that display duration of the right-eye display system reaches second preset duration, turn off the right-eye display system and maintain the off state of the left-eye display system; and in response to that the off state of the right-eye display system lasts for the switching time interval, control the left-eye display system to display the image and maintain the off state of the right-eye display system. The first preset duration is equal to the second preset duration.

The display control unit is further configured to: if the current display mode is a two-dimensional display mode, determine that the switching time interval is a first switching time interval, or if the current display mode is a three-dimensional display mode, determine that the switching time interval is a second switching time interval, where the second switching time interval is less than the first switching time interval.

The display control unit is further configured to: if the current display mode is the two-dimensional display mode, when the left-eye display system displays the image, adjust a brightness grayscale of the image displayed by the left-eye display system, or when the right-eye display system displays the image; adjust a brightness grayscale of the image displayed by the right-eye display system. The display control unit is further configured to: determine the first preset duration based on a preset quantity of frames of left-eye display; and determine the second preset duration based on a preset quantity of frames of right-eye display, where the quantity of frames of left-eye display is equal to the quantity of frames of right-eye display.

The display control unit is further configured to: based on an environmental parameter or a user-input instruction, determine that the head-mounted display device enables the low power consumption display mode. The environmental parameter includes a temperature of the head-mounted display device or a battery level of the head-mounted display device.

Figure 9:
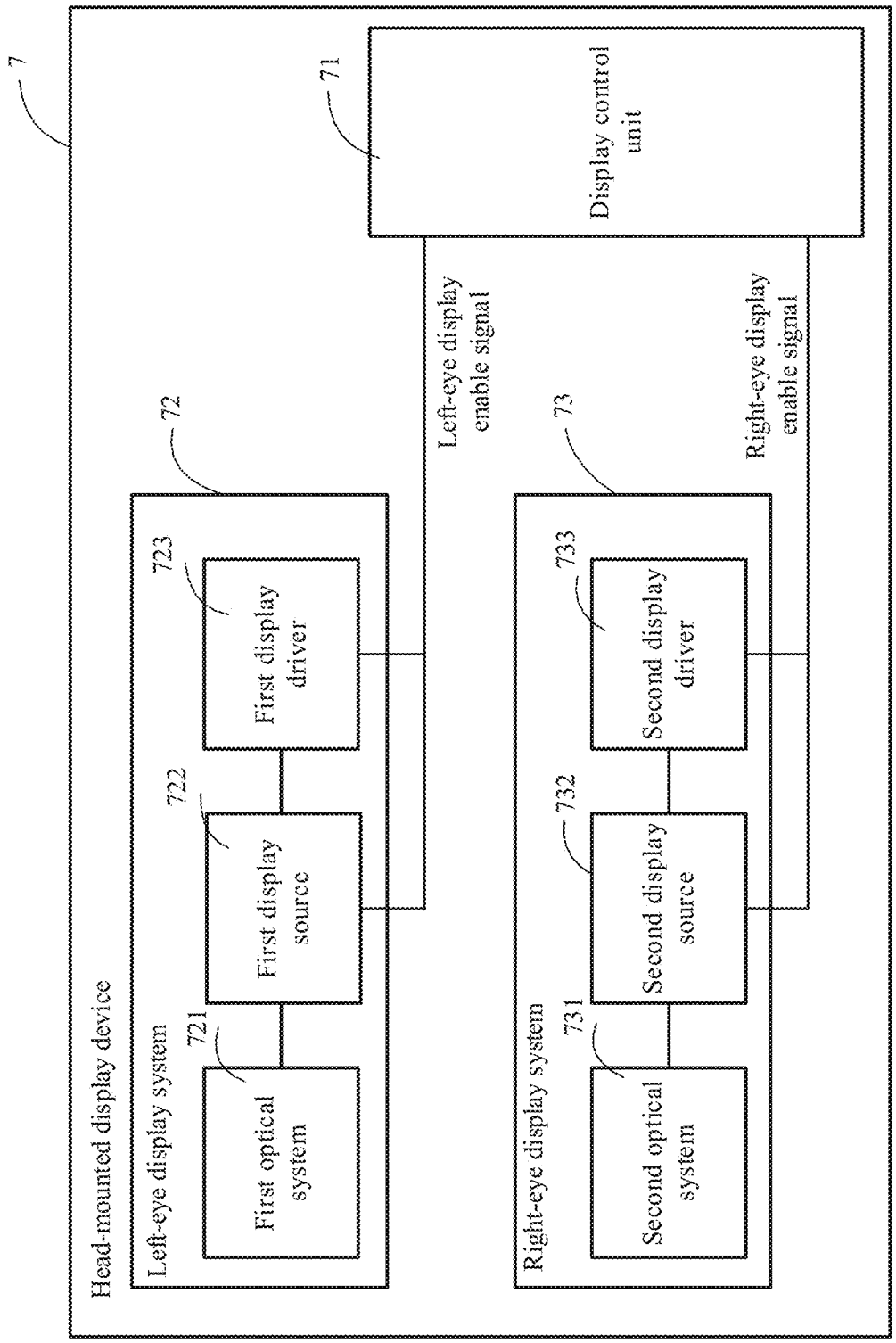
FIG. 9 is a schematic structural diagram of a first head-mounted display device according to an embodiment of this application.

FIG. 9 is a schematic structural diagram of a first head-mounted display device according to an embodiment of this application.

Refer to FIG. 9. The head-mounted display device 7 includes a display control unit 71, a left-eye display system 72, and a right-eye display system 73. The display control unit 71 is configured to: determine a current display mode in response to that the head-mounted display device 7 enables a low power consumption display mode; determine a switching time interval based on the current display mode; control the left-eye display system 72 to display an image and control the right-eye display system 73 to be turned off; in response to that display duration of the left-eye display system 72 reaches first preset duration, turn off the left-eye display system 72 and maintain an off state of the right-eye display system 73; and in response to that an off state of the left-eye display system 72 lasts for the switching time interval, control the right-eye display system 73 to display the image and maintain the off state of the left-eye display system 72.

The display control unit 71 is further configured to: in response to that display duration of the right-eye display system 73 reaches second preset duration, turn off the right-eye display system 73 and maintain the off state of the left-eye display system 72; and in response to that the off state of the right-eye display system 73 lasts for the switching time interval, control the left-eye display system 72 to display the image and maintain the off state of the right-eye display system 73.

Specifically, the left-eye display system 72 includes a first optical system 721, a first display source 722, and a first display driver module 723. The first optical system 721 is connected to the first display source 722, and the first display driver module 723 is connected to the first display source 722. The first display driver module 723 is configured to drive the left-eye display system 72, the first optical system 721 is configured to generate the image, and the first display source 722 is configured to control a brightness grayscale of the image.

The right-eye display system 73 includes a second optical system 731, a second display source 732, and a second display driver module 733. The second optical system 731 is connected to the second display source 732, and the second display driver module 733 is connected to the second display source 732. The second display driver module 733 is configured to drive the right-eye display system 73, the second optical system 731 is configured to generate the image, and the second display source 732 is configured to control a brightness grayscale of the image.

The display control unit 71 controls turning on and turning off of the first display source 722 and the first display driver module 723 in the left-eye display system 72 by using a left-eye display enable signal. The display control unit 71 controls turning on and turning off of the second display source 732 and the second display driver module 733 in the right-eye display system 73 by using a right-eye display enable signal. The left-eye display enable signal and the right-eye display enable signal may be a high-level signal, a low-level signal, a specific coded signal, or the like. For example, a high-level signal and a low-level signal are used as an example. If the enable signal is the high-level signal, the display source and the display driver module in the display system are controlled to be turned on; or if the enable signal is the low-level signal, the display source and the display driver module in the display system are controlled to be turned off.

Figure 10:
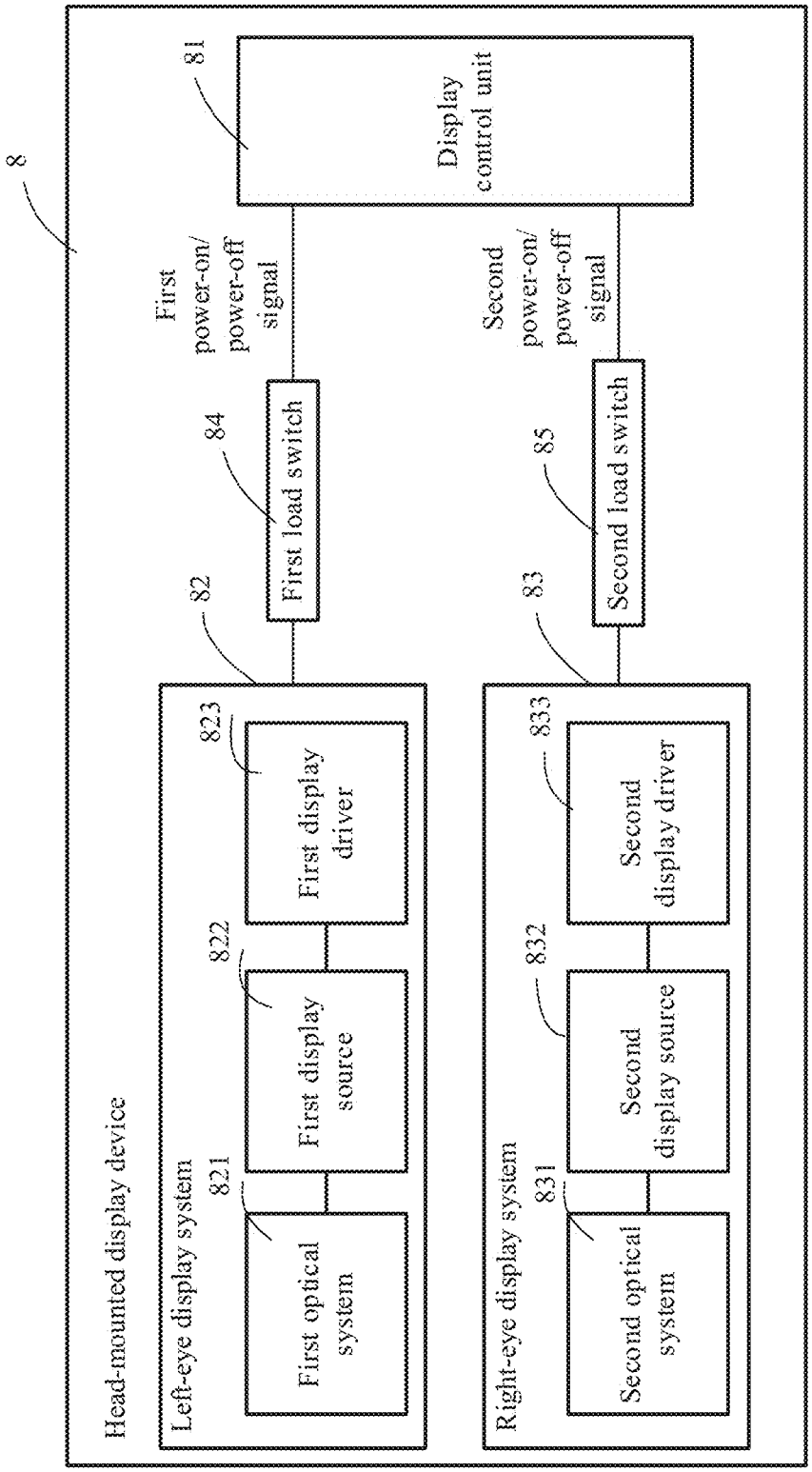
FIG. 10 is a schematic structural diagram of a second head-mounted display device according to an embodiment of this application.

FIG. 10 is a schematic structural diagram of a second head-mounted display device according to an embodiment of this application.

Refer to FIG. 10. The head-mounted display device 8 includes a display control unit 81, a left-eye display system 82, and a right-eye display system 83. The display control unit 81 is configured to: determine a current display mode in response to that the head-mounted display device 8 enables a low power consumption display mode; determine a switching time interval based on the current display mode; control the left-eye display system 82 to display an image and control the right-eye display system 83 to be turned off; in response to that display duration of the left-eye display system 82 reaches first preset duration, turn off the left-eye display system 82 and maintain an off state of the right-eye display system 83; and in response to that an off state of the left-eye display system 82 lasts for the switching time interval, control the right-eye display system 83 to display the image and maintain the off state of the left-eye display system 82.

The display control unit 81 is further configured to: in response to that display duration of the right-eye display system 83 reaches second preset duration, turn off the right-eye display system 83 and maintain the off state of the left-eye display system 82; and in response to that the off state of the right-eye display system 83 lasts for the switching time interval, control the left-eye display system 82 to display the image and maintain the off state of the right-eye display system 83.

Different from the embodiment shown in FIG. 9, in this embodiment, the head-mounted display device 8 further includes a first load switch 84 and a second load switch 85. The first load switch 84 is disposed between the display control unit 81 and the left-eye display system 82. The display control unit 81 controls a working state of the first load switch 84 by using a first power-on/power-off control signal, to control turning on and turning off of the left-eye display system 82. The second load switch 85 is disposed between the display control unit 81 and the right-eye display system 83. The display control unit 81 controls a working state of the second load switch 85 by using a second power-on/power-off control signal, to control turning on and turning off of the right-eye display system 83. Similar to the left-eye display enable signal and the right-eye display enable signal in FIG. 7, the first power-on/power-off control signal and the second power-on/power-off control signal may also be a high-level signal, a low-level signal, a specific coded signal, or the like. Details are not described herein again.

Figure 11A:
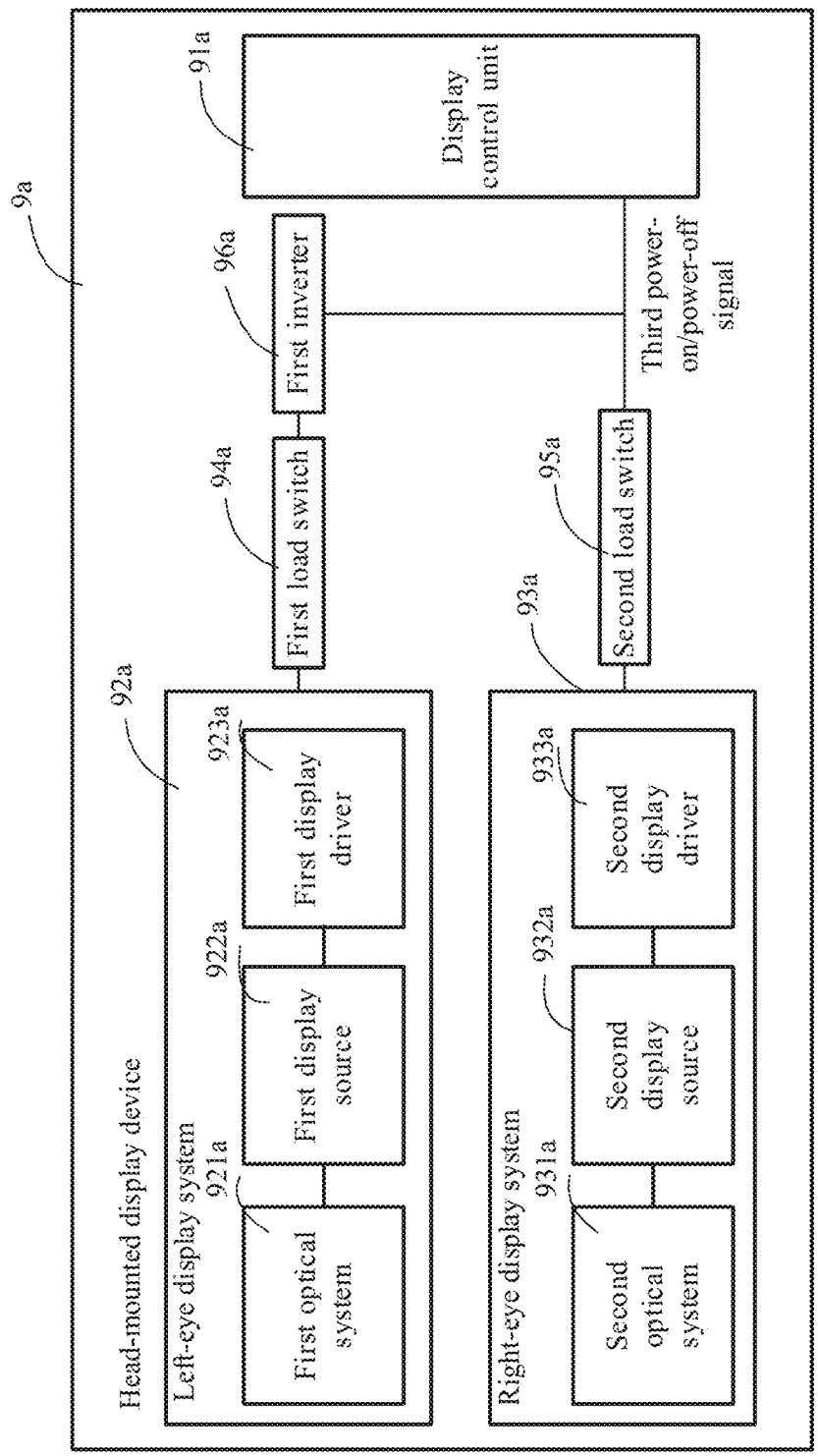
FIG. 11A is a schematic structural diagram of a third head-mounted display device according to an embodiment of this application.

FIG. 11A is a schematic structural diagram of a third head-mounted display device according to an embodiment of this application. Refer to FIG. 11A. The head-mounted display device 9a includes a display control unit 91a, a left-eye display system 92a, and a right-eye display system 93a. The display control unit 91a is configured to: determine a current display mode in response to that the head-mounted display device 9a enables a low power consumption display mode; determine a switching time interval based on the current display mode; control the left-eye display system 92a to display an image and control the right-eye display system 93a to be turned off; in response to that display duration of the left-eye display system 92a reaches first preset duration, turn off the left-eye display system 92a and maintain an off state of the right-eye display system 93a; and in response to that an off state of the left-eye display system 92a lasts for the switching time interval, control the right-eye display system 93a to display the image and maintain the off state of the left-eye display system 92a.

The display control unit 91a is further configured to: in response to that display duration of the right-eye display system 93a reaches second preset duration, turn off the right-eye display system 93a and maintain the off state of the left-eye display system 92a, and in response to that the off state of the right-eye display system 93a lasts for the switching time interval, control the left-eye display system 92a to display the image and maintain the off state of the right-eye display system 93a.

Different from the embodiments shown in FIG. 9 and FIG. 10, in this embodiment, the head-mounted display device 9a further includes a first load switch 94a, a second load switch 95a, and a first inverter 96a. The first load switch 94a is connected between the left-eye display system 92a and the first inverter 96a. The second load switch 95a is connected between the right-eye display system 93a and the display control unit 91a. The display control unit 91a controls the second load switch 95a by using a third power-on/power-off control signal, to control turning on and turning off of the right-eye display system 93a, and the third power-on/power-off control signal controls the first load switch 94a by using the third power-on/power-off control signal that has passed through the first inverter 96a, to control turning on and turning off of the left-eye display system 92a. Similar to the first power-on/power-off control signal or the second power-on/power-off control signal in the embodiment shown in FIG. 10, the third power-on/power-off control signal may also be a high-level signal, a low-level signal, a specific coded signal, or the like.

Figure 11B:
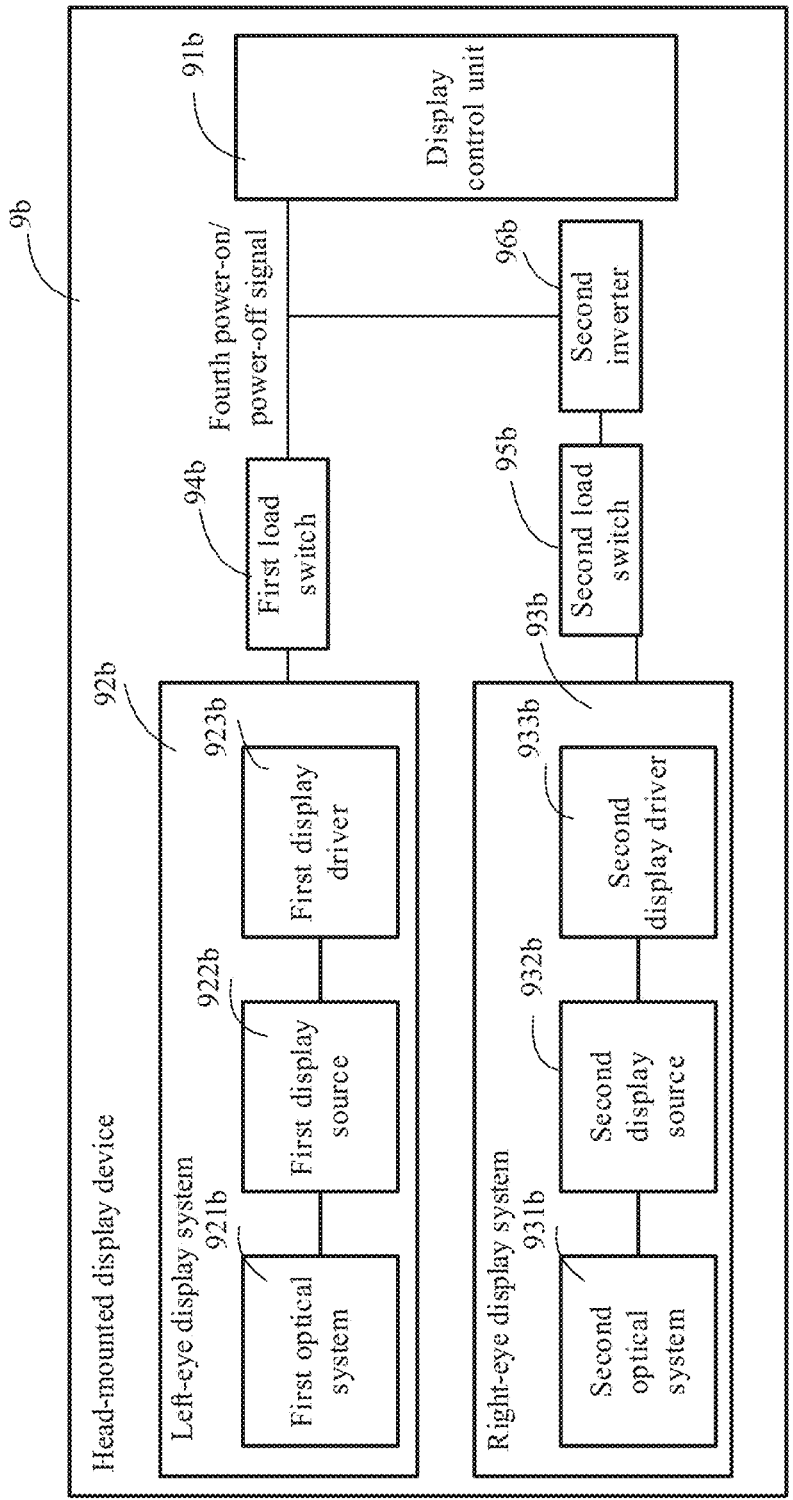
FIG. 11B is a schematic structural diagram of a fourth head-mounted display device according to an embodiment of this application.

FIG. 11B is a schematic structural diagram of a fourth head-mounted display device according to an embodiment of this application. Refer to FIG. 11B. The head-mounted display device 9b includes a display control unit 91b, a left-eye display system 92b, and a right-eye display system 93b. The display control unit 91b is configured to: determine a current display mode in response to that the head-mounted display device 9b enables a low power consumption display mode; determine a switching time interval based on the current display mode; control the left-eye display system 92*b* to display an image and control the right-eye display system 93*b* to be turned off; in response to that display duration of the left-eye display system 92*b* reaches first preset duration, turn off the left-eye display system 92*b* and maintain an off state of the right-eye display system 93*b*; and in response to that an off state of the left-eye display system 92*b* lasts for the switching time interval, control the right-eye display system 93*b* to display the image and maintain the off state of the left-eye display system 92*b*.

The display control unit 91*h* is further configured to: in response to that display duration of the right-eye display system 93*b* reaches second preset duration, turn off the right-eye display system 93*b* and maintain the off state of the left-eye display system 92*b*; and in response to that the off state of the right-eye display system 93*h* lasts for the switching time interval, control the left-eye display system 92*h* to display the image and maintain the off state of the right-eye display system 93*b*.

In this embodiment, the head-mounted display device 9*b* further includes a first load switch 94*b*, a second load switch 95*b*, and a second inverter 96*b*. Different from the embodiment shown in FIG. 11A, in this embodiment, the second load switch 95*b* is connected between the right-eye display system 93*b* and the second inverter 96*h*, and the first load switch 94*b* is connected between the left-eye display system 92*b* and the display control unit 91*b*. The display control unit 91*b* controls the first load switch 94*b* by using a fourth power-on/power-off control signal, to control turning on and turning off of the left-eye display system 92*b*, and the fourth power-on/power-off control signal controls the second load switch 95*b* after passing through the second inverter 96*b*, to control turning on and turning off of the right-eye display system 93*b*. Similar to the third power-on/power-off control signal in the embodiment shown in FIG. 11A, the fourth power-on/power-off control signal may also be a high-level signal, a low-level signal, a specific coded signal, or the like.

In the embodiments shown in FIG. 9, FIG. 10, FIG. 11A, and FIG. 11B, the display control unit of the head-mounted display device controls the left-eye display system and the right-eye display system in different control manners. For example, the display control a nit directly controls turning on and turning off of the two display systems by using the enable signal (the embodiment shown in FIG. 9). For another example, the display control unit controls the two load switches by using two power-on/power-off control signals, and further controls turning on and turning off of the two display systems separately (the embodiment shown in FIG. 10). For still another example, the display control unit controls one load switch by using one power-on/power-off control signal, and then controls turning on and turning off of one of the display systems; and controls the other load switch by using the power-on/power off signal on which the inverter has performed reverse processing, and then controls turning on and turning off of the other display system.

It should be noted that, in the embodiments shown in FIG. 11A and FIG. 11B, the display control unit outputs only one power-on/power-off control signal to control one load switch, and the inverter performs reverse processing on the power-on/power-off control signal to control the other load switch. Therefore, a time interval for alternate switching between the two display systems depends on a delay in reverse processing performed by the inverter on one power-on/power-off control signal. In actual application, it is difficult to achieve a zero delay in reverse processing performed by the inverter on a power-on/power-off control signal.

Figure 12:
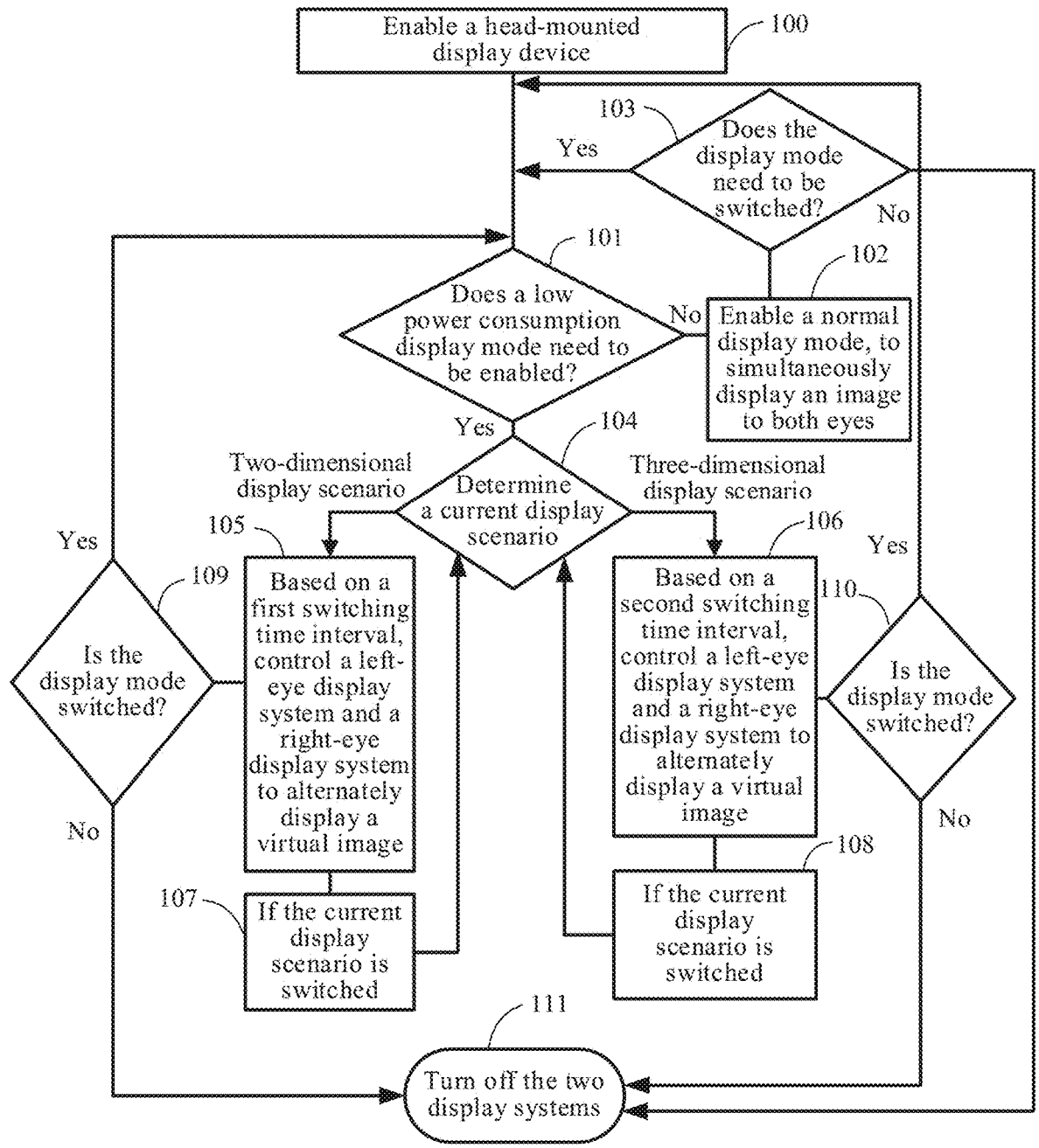
FIG. 12 is a schematic flowchart of a fifth display method of a head-mounted display device according to an embodiment of this application.

FIG. 12 is a schematic flowchart of a fifth display method of a head-mounted display device according to an embodiment of this application. Refer to FIG. 12. The display method includes the following steps.

Step 100: Enable the head-mounted display device.

Step 101: Determine whether to enable a low power consumption display mode. If a determining result is no, perform step 102 and step 103; or if a determining result is yes, perform step 104.

Step 102: Enable a normal display mode, to simultaneously display with the left-eye display system and a right-eye display system.

Step 103: Determine whether to switch the display mode. If a determining result is no, perform step 111; or if a determining result is yes, perform step 101.

Step 104: Determine a current display mode. If the current display mode is a two-dimensional display mode, perform step 105; or if the current display mode is a three-dimensional display mode, perform step 106.

Step 105: Based on a first switching time interval, control a left-eye display system and a right-eye display system to alternately display an image. Perform step 107 or step 109 after step 105.

Step 106: Based on a second switching time interval, control a left-eye display system and a right-eye display system to alternately display an image. Perform step 108 and step 110 after step 106.

Step 107: If the current display mode is switched, perform step 104.

Step 108: If the current display mode is switched, perform step 104.

Step 109: Determine whether the display mode is switched. If a determining result is no, perform step 111; or if a determining result is yes, perform step 101.

Step 110: Determine whether the display mode is switched. If a determining result is no, perform step 111; or if a determining result is yes, perform step 101.

Step 111: Turn off the two display systems.

Figure 13:
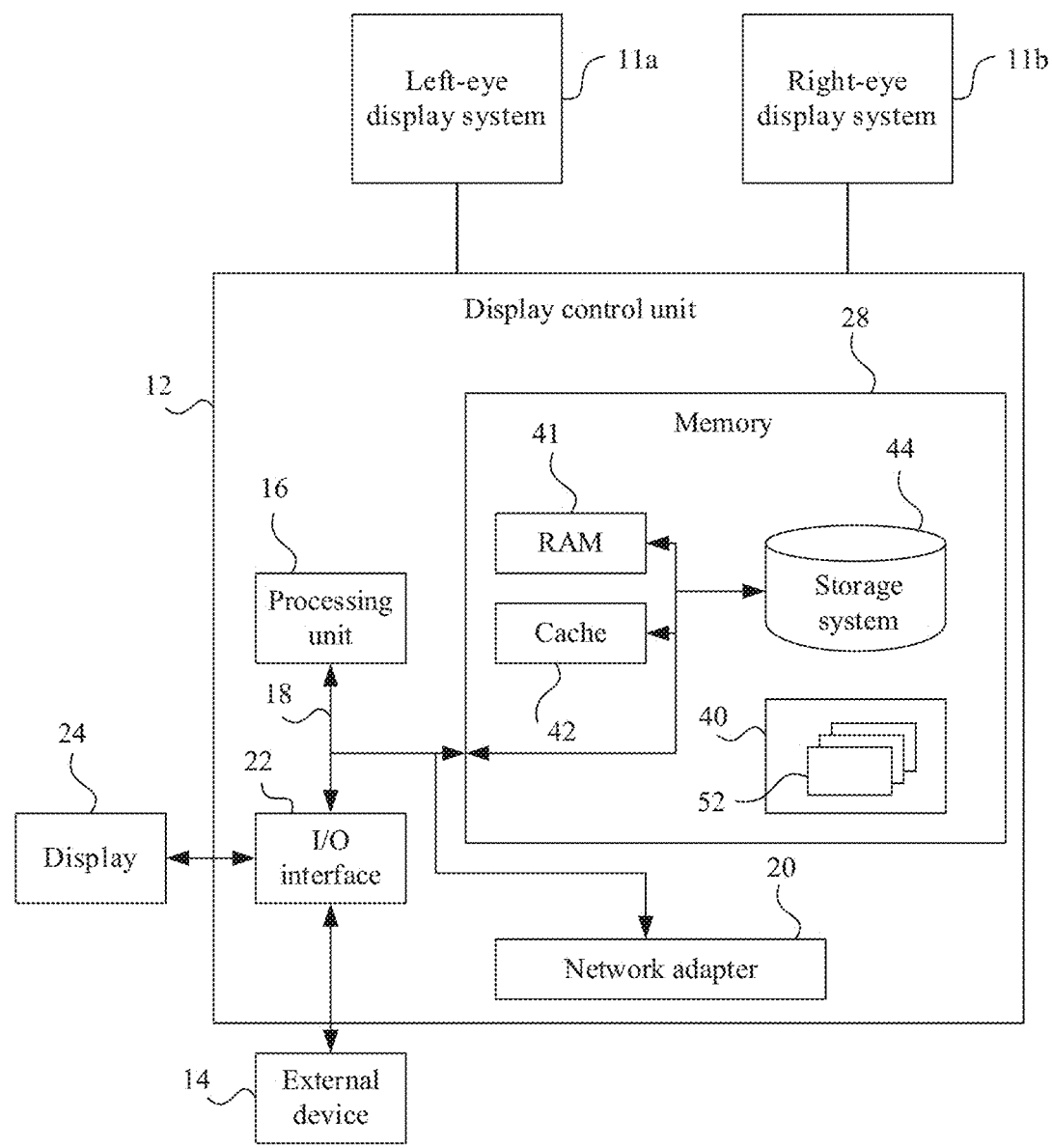
FIG. 13 is a schematic structural diagram of an embodiment of a head-mounted display device according to an embodiment of this application.

FIG. 13 is a schematic structural diagram of an embodiment of a head-mounted display device according to an embodiment of this application.

The head-mounted display device includes a display control unit 12, a left-eye display system 11*a*, and a right-eye display system 11*b*. The display control unit 12 may include a memory, a processor, and a computer program that is stored in the memory and that can be run in the processor. When the processor executes the computer program, the display method provided in the embodiments of this application can be implemented.

The device may be a server, for example, a cloud server, or may be an electronic device, for example, a smart electronic device such as a smartphone, a smartwatch, or a tablet computer. A specific form of the computer device is not limited in this embodiment.

FIG. 13 is a block diagram of an example of the display control unit 12 suitable for implementing the embodiment of this application. The display control unit 12 shown in FIG. 13 is merely an example, and should not impose any limitation on a function and a use scope of the embodiment of this application.

As shown in FIG. 13, the display control unit 12 is represented in a form of a general-purpose computing device. Components of the display control unit 12 may include but are not limited to: one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, a graphics acceleration port, a processor, or a local bus using any bus structure of various bus structures. For example, these architectures include but are not limited to an industry standard architecture (Industry Standard Architecture, ISA for short hereinafter) bus, a micro channel architecture (Micro Channel Architecture, MAC for short hereinafter) bus, an enhanced ISA bus, a video electronics standards association (Video Electronics Standards Association, VESA for short hereinafter) local bus, and a peripheral component interconnection (Peripheral Component interconnection, PCI for short hereinafter) bus.

The display control unit 12 typically includes a variety of computer system readable media. These media may be any usable media that can be accessed by the display control unit 12, including volatile and non-volatile media, and removable and non-removable media.

The system memory 28 may include a computer system readable medium in a form of a volatile memory, such as a random access memory (Random Access Memory, RAM for short hereinafter) 41 and/or a cache memory 42. The display control unit 12 may further include other removable/non-removable, and volatile/non-volatile computer system storage media. For example only, a storage system 44 may be configured to read data from and write data to a non-removable and non-volatile magnetic medium (not shown in FIG. 11 and commonly referred to as a "hard disk drive"). Although not shown in FIG. 11, a disk drive configured to read data from and write data to a removable and non-volatile disk (for example, a "floppy disk") may be provided, and an optical disc drive configured to read data from and write data to a removable and non-volatile optical disc (for example, a compact disc read-only memory (Compact Disc Read Only Memory, CD-ROM for short hereinafter), a digital versatile disc read-only memory (Digital Versatile Disc Read Only Memory, DVD-ROM for short hereinafter), or another optical medium) may be provided. In these cases, each drive may be connected to the bus 18 through one or more data medium interfaces. The memory 28 may include at least one program product, the program product includes a se of (for example, at least one) program modules, and these program modules are configured to perform functions provided in the embodiments of this application.

A program/utility 40 that includes a set of (at least one) program modules 52 may be stored in, for example, the memory 28. Such a program module 52 includes but is not limited to an operating system, one or more application programs, another program module, and program data. Each of or a specific combination of these examples may include implementation of a network environment. The program module 52 usually performs a function and/or a method in the embodiments described in this application.

The display control unit 12 may communicate with one or more external devices 14 (for example, a keyboard, a pointing device, and a display 24), and may further communicate with one or more devices that enable a user to interact with the display control unit 12, and/or communicate with any device (for example, a network adapter or a modern) that enables the display control unit 12 to communicate with one or more other computing devices. Such communication may be performed through an input/output (I/O) interface 22. In addition, the display control unit 12 may further communicate with one or more networks (for example, a local area network (Local Area Network. LAN for short hereinafter), a wide area network (Wide Area Network, WAN for short hereinafter), and/or a public network, for example, the internee) through a network adapter 20. As shown in FIG. 11, the network adapter 20 communicates with another module of the display control unit 12 through the bus 18. It should be understood that, although not shown in FIG. 11, other hardware and/or software modules may be used in combination with the display control unit 12, including but not limited to microcode, a device drive, a redundant processing unit, an external disk drive array, a RAID system, a tape drive, and a data backup storage system.

The processing unit 16 runs a program stored in the system memory 28 to execute various functional applications and data processing, for example, implementing the head-mounted display method provided in the embodiments of this application.

An embodiment of this application further provides a non-temporary computer readable storage medium that stores a computer program. When the computer program is executed by a processor, the head-mounted display method provided in the embodiments of this application can be implemented.

Any combination of one or more computer readable media may be used as the non-temporary computer readable storage medium. The computer readable medium may be a computer readable signal medium or a computer readable storage medium. For example, the computer readable storage medium may be but is not limited to an electrical, magnetic, optical, electromagnetic, infrared, or semiconductor system, apparatus, or device, or any combination thereof more specific examples (non-exhaustive list) of the computer readable storage medium include: an electrical connection including one or more wires, a portable computer disk, a hard disk, a random access memory (RAM), a read-only memory (Read Only Memory, ROM for short hereinafter), an erasable programmable read-only memory (Erasable Programmable Read Only Memory, EPROM for short hereinafter) or a flash memory, an optical fiber, a portable compact disc read-only memory (CD-ROM), an optical storage device, a magnetic storage device, or any suitable combination thereof. In this embodiment of this invention, the computer readable storage medium may be any tangible medium including or storing a program that may be used by an instruction execution system, apparatus, or device, or be used in combination with an instruction execution system, apparatus, or device.

A computer readable signal medium may include a data signal propagated in a baseband or propagated as part of a carrier, where the data signal carries computer readable program code. Such a propagated data signal may take a variety of forms, including but not limited to an electromagnetic signal, an optical signal, or any suitable combination thereof. The computer readable signal medium may alternatively be any computer readable medium other than the computer readable storage medium. The computer readable medium may send, propagate, or transmit the program used by the instruction execution system, apparatus, or device, or used in combination with the instruction execution system, apparatus, or device.

Program code included in the computer readable medium may be transmitted by using any suitable medium, including but not limited to wireless, a wire, an optical cable, and RF, or any suitable combination thereof.

Computer program code for performing the operations in this application may be written in one or more programming languages, or a combination thereof. The programming languages include an object-oriented programming language, such as Java, Smalltalk, and C++, and also include a conventional procedural programming language, such as a "C" language or a similar programming language. The program code may be executed entirely on the user's computer, partially on the user's computer; as a separate software package, partially on the user's computer, partially on the remote computer, or entirely on the remote computer or server. In a case in which a remote computer is used, the remote computer may be connected to a user computer through any type of network, including a local area network (Local Area Network, LAN for short hereinafter) or a wide area network (Wide Area Network, WAN for short hereinafter), or may be connected to an external computer (for example, connected to the external computer through the internet provided by an internet service provider).

In conclusion, by using the head-mounted display device and the display method thereof that are provided in the technical solutions of this application, when the head-mounted display device enables the low power consumption display mode, the left-eye and right-eye display systems of the head-mounted display device alternately display an image (to be specific, the left-eye display system and the right-eye display system are switched in turn to display the image) instead of simultaneously displaying the image. The switching time interval for the left-eye display system and the right-eye display system to alternately display the image is determined based on the current display mode. Different current display modes may be corresponding to different switching time intervals, or may be corresponding to a same switching time interval. Therefore, in the low power consumption display mode, only one display system (the left-eye display system or right-eye display system) displays the image within a same time period, and thus power consumption of the display systems of the head-mounted display device is reduced.

The foregoing descriptions are merely example embodiments of this application, but are not intended to limit this application. Any modification, equivalent replacement, or improvement made without departing from the principle of this application should fall within the protection scope of this application.

What is claimed is:

1. A display method implemented by a head-mounted display device, wherein the display method comprises:
   making a first determination that the head-mounted display device enables a low power consumption display mode;
   determining, in response to the first determination, a current display mode, wherein the current display mode is a two-dimensional display mode or a three-dimensional display mode;
   determining a switching time interval based on the current display mode, wherein the switching time interval is a first switching time interval when the current display mode is the two-dimensional display mode, wherein the switching time interval is a second switching time interval when the current display mode is the three-dimensional display mode, and wherein the second switching time interval is less than the first switching time interval;
   controlling a left-eye display system of the head-mounted display device to display a first image and a right-eye display system of the head-mounted display device to be turned off;
   making a second determination that a first display duration of the left-eye display system has reached a first preset duration;
   in response to the second determination:
      turning off the left-eye display system; and
      maintaining a first off state of the right-eye display system;
   making a third determination that a second off state of the left-eye display system has lasted for the switching time interval;
   in response to the third determination:
      controlling the right-eye display system to display a second image; and
      maintaining the second off state;
   making a fourth determination that a second display duration of the right-eye display system has reached a second preset duration;
   in response to the fourth determination:
      turning off the right-eye display system; and
      maintaining the second off state;
   making a fifth determination that the first off state has lasted for the switching time interval; and
   in response to the fifth determination:
      controlling the left-eye display system to display the first image; and
      maintaining the first off state.

2. The display method of claim 1, wherein the first preset duration is equal to the second preset duration.

3. The display method of claim 1, further comprising:
   determining the first preset duration based on a first preset quantity of frames of the left-eye display system; and
   determining the second preset duration based on a second preset quantity of frames of the right-eye display system.

4. The display method of claim 3, wherein the first preset quantity of frames is equal to the second preset quantity of frames.

5. The display method of claim 1, wherein the current display mode is the two-dimensional display mode, and wherein the display method further comprises:
   adjusting a first brightness grayscale of the first image when the left-eye display system displays the first image; and
   adjusting a second brightness grayscale of the second image when the right-eye display system displays the second image.

6. The display method of claim 1, further comprising determining, based on an environmental parameter or a user-input instruction, that the head-mounted display device enables the low power consumption display mode.

7. The display method of claim 6, wherein the environmental parameter comprises a temperature of the head-mounted display device or a battery level of the head-mounted display device.

8. A head-mounted display device comprising:
   a left-eye display system;
   a right-eye display system;
   a memory configured to store instructions; and
   a processor coupled to the left-eye display system, right-eye display system, and the memory, wherein the instructions cause the processor to be configured to:
      make a first determination that the head mounted display system enables a low power consumption display mode;
      determine, in response to the first determination, a current display mode, wherein the current display mode is a two-dimensional display mode or a three-dimensional display mode;
      determine a switching time interval based on the current display mode, wherein the switching time interval is a first switching time interval when the current display mode is a two-dimensional display mode, wherein the switching time interval is the second switching time interval when the current display mode is the three-dimensional display mode, and wherein the second switching time interval is less than the first switching time interval;

control the left-eye display system to display a first image and the right-eye display system to be turned off;

make a second determination that a first display duration of the left-eye display system has reached a first preset duration;

in response to the second determination:
  turn off the left-eye display system; and
  maintain a first off state of the right-eye display system;

make a third determination that a second off state of the left-eye display system has lasted for the switching time interval;

in response to the third determination:
  control the right-eye display system to display a second image; and
  maintain the second off state;

make a fourth determination that a second display duration of the right-eye display system has reached a second preset duration;

in response to the fourth determination:
  turn off the right-eye display system; and
  maintain the second off state;

make a fifth determination that the first off state has lasted for the switching time interval; and in response to the fifth determination:
  control the left-eye display system to display the first image; and
  maintain the first off state.

9. The head-mounted display device of claim 8, wherein the first preset duration is equal to the second preset duration.

10. The head-mounted display device of claim 8, wherein the instructions further cause the processor to be configured to:
  determine the first preset duration based on a first preset quantity of frames of the left-eye display system; and
  determine the second preset duration based on a second preset quantity of frames of the right-eye display system.

11. The head-mounted display device of claim 10, wherein the first preset quantity of frames is equal to the second preset quantity of frames.

12. The head-mounted display device of claim 8, wherein the current display mode is the two-dimensional display mode, and wherein the instructions further cause the processor to be configured to:
  adjust a first brightness grayscale of the first image when the left-eye display system displays the first image; and
  adjust a second brightness grayscale of the second image when the right-eye display system displays the second image.

13. The head-mounted display device of claim 8, wherein the instructions further cause the processor to be configured to determine, based on an environmental parameter or a user-input instruction, that the head-mounted display device enables the low power consumption display mode, and wherein the environmental parameter comprises a temperature of the head-mounted display device or a battery level of the head-mounted display device.

14. A computer program product comprising computer-executable instructions that are stored on a non-transitory computer readable storage medium and that, when executed by a processor, cause a head-mounted display device to:
  enable a low power consumption display mode;
  determine, in response to enabling the low power consumption display mode, a current display mode, wherein the current display mode is a two-dimensional display mode or a three-dimensional display mode;
  determine a switching time interval based on the current display mode, wherein the switching time interval is a first switching time interval when the current display mode is a two-dimensional display mode, wherein the switching time interval is the second switching time interval when the current display mode is the three-dimensional display mode, and wherein the second switching time interval is less than the first switching time interval;
  control a left-eye display system of the head-mounted display device to display a first image and a right-eye display system of the head-mounted display device to be turned off;
  make a second determination that a first display duration of the left-eye display system has reached a first preset duration;
  in response to the second determination:
    turn off the left-eye display system; and
    maintain a first off state of the right-eye display system;
  make a third determination that a second off state of the left-eye display system has lasted for the switching time interval;
  in response to the third determination:
    control the right-eye display system to display a second image; and
    maintain the second off state;
  make a fourth determination that a second display duration of the right-eye display system has reached a second preset duration;
  in response to the fourth determination:
    turn off the right-eye display system; and
    maintain the second off state;
  make a fifth determination that the first off state has lasted for the switching time interval; and
  in response to the fifth determination:
    control the left-eye display system to display the first image; and
    maintain the first off state.

15. The computer program product of claim 14, wherein the first preset duration is equal to the second preset duration.

16. The computer program product of claim 14, wherein the first preset quantity of frames is equal to the second preset quantity of frames.

17. The computer program product of claim 14, wherein the current display mode is the two-dimensional display mode, and wherein the computer-executable instructions, when executed by the processor, cause the head-mounted display device to:
  adjust a first brightness grayscale of the first image when the left-eye display system displays the first image; and
  adjust a second brightness grayscale of the second image when the right-eye display system displays the second image.

18. The computer program product of claim 14, wherein the computer-executable instructions, when executed by the processor, cause the head-mounted display device to determine based on an environmental parameter or a user-input instruction, that the head-mounted display device enables the low power consumption display mode.

19. The computer program product of claim 14, wherein the environmental parameter comprises a temperature of the head-mounted display device.

20. The computer program product of claim 14, wherein the environmental parameter comprises a battery level of the head-mounted display device.

* * * * *